US012809626B2

(12) United States Patent
Zhang et al.

(10) Patent No.: US 12,809,626 B2
(45) Date of Patent: Nov. 24, 2026

(54) TENSOR TRANSPOSE PROCESSOR

(71) Applicant: MOFFETT INTERNATIONAL CO., LIMITED, Kowloon (HK)

(72) Inventors: Changxu Zhang, Los Altos, CA (US); Zhibin Xiao, Los Altos, CA (US); Enxu Yan, Los Altos, CA (US); Xiaoqian Zhang, Los Altos, CA (US); Renjie Chen, Los Altos, CA (US)

(73) Assignee: Moffett International Co., Limited, Kowloon (HK)

( * ) Notice: Subject to any disclaimer, the term of this patent is extended or adjusted under 35 U.S.C. 154(b) by 13 days.

(21) Appl. No.: 18/812,278

(22) Filed: Aug. 22, 2024

(65) Prior Publication Data

US 2026/0044376 A1 Feb. 12, 2026

Related U.S. Application Data

(63) Continuation-in-part of application No. 18/798,035, filed on Aug. 8, 2024, now Pat. No. 12,675,293.

(51) Int. Cl.
*G06F 9/30* (2018.01)
*G06F 7/78* (2006.01)
(Continued)

(52) U.S. Cl.
CPC ...... *G06F 9/30036* (2013.01); *G06F 9/30032* (2013.01); *G06F 9/30038* (2023.08);
(Continued)

(58) Field of Classification Search
CPC ............ G06F 9/30032; G06F 9/30036; G06F 9/30038; G06F 7/78; G06F 12/0207; G06F 17/16
See application file for complete search history.

(56) References Cited

U.S. PATENT DOCUMENTS 4,918,527 A * 4/1990 Penard .................... G06F 17/16 348/718
10,872,038 B1 * 12/2020 Nair ........................ G06F 7/468
(Continued)

OTHER PUBLICATIONS

Yen, Ian En-Hsu, Zhibin Xiao and Dongkuan Xu. "S4: a High-sparsity, High-performance AI Accelerator." ArXiv (Year: 2022).*
(Continued)

*Primary Examiner* — Jyoti Mehta
*Assistant Examiner* — Kasim Alli
(74) *Attorney, Agent, or Firm* — Sheppard Mullin Richter & Hampton LLP

(57) ABSTRACT

The present invention relates to a processor designed to optimize memory bandwidth utilization for tensor transpositions in machine learning. An example processor includes an input tensor shift buffer, a staging buffer, and an output tensor shift buffer. The input tensor shift buffer reads an input tensor from input memory and performs multiple cycles of input tensor shifting. The shifted tensor data is then written into the staging buffer. The output tensor shift buffer reads the shifted tensor data from the staging buffer and performs multiple cycles of output tensor shifting. Finally, the result is written to the output memory. This configuration facilitates efficient handling and transformation of tensor data, optimizing the computational processes required in machine learning tasks.

20 Claims, 15 Drawing Sheets

(51) Int. Cl.
*G06F 12/02* (2006.01)
*G06F 17/16* (2006.01)

(52) U.S. Cl.
CPC ............ *G06F 7/78* (2013.01); *G06F 12/0207* (2013.01); *G06F 17/16* (2013.01)

(56) References Cited

U.S. PATENT DOCUMENTS

| | | | | |
|---|---|---|---|---|
| 2002/0032710 | A1 | 3/2002 | Saulsbury et al. | |
| 2003/0043639 | A1 | 3/2003 | Dupont | |
| 2009/0300091 | A1* | 12/2009 | Brokenshire | G06F 17/16 708/607 |
| 2012/0106287 | A1* | 5/2012 | Catovic | G11C 8/06 365/230.03 |
| 2018/0188972 | A1* | 7/2018 | Yang | G06F 3/0646 |
| 2018/0189227 | A1 | 7/2018 | Korthikanti et al. | |
| 2019/0042248 | A1* | 2/2019 | Bradford | G06F 9/30109 |
| 2021/0406686 | A1 | 12/2021 | Xiao et al. | |
| 2022/0172059 | A1* | 6/2022 | Yan | G06N 3/082 |
| 2022/0405348 | A1 | 12/2022 | Lichtenau et al. | |
| 2023/0176981 | A1* | 6/2023 | Wei | G06F 12/0207 711/165 |
| 2023/0214236 | A1 | 7/2023 | Mansell | |
| 2024/0264948 | A1* | 8/2024 | Trivedi | G06N 3/084 |
| 2024/0345903 | A1 | 10/2024 | Brothers, III et al. | |
| 2025/0217149 | A1 | 7/2025 | Pillai et al. | |

OTHER PUBLICATIONS

Non-Final Office Action dated Nov. 5, 2025, issued in U.S. Appl. No. 18/798,035 (13 pages).

Moffett AI, "Introduction to Sparse Computing Whitepaper" (Year: 2022).

* cited by examiner

TENSOR TRANSPOSE PROCESSOR

CROSS-REFERENCE TO RELATED APPLICATIONS

The application is a continuation-in-part (CIP) application of U.S. patent application Ser. No. 18/798,035, filed Aug. 8, 2024, and titled PROCESSOR, METHOD, AND SYSTEM FOR ACCELERATING TENSOR TRANSPOSE FOR MACHINE LEARNING. The entire contents of the above-identified application are incorporated herein by reference.

TECHNICAL FIELD

The disclosure generally relates to a hardware design for accelerating tensor transposition in machine learning, in particular, a processor with built-in engine for streamlining tensor transposition operations in neural networks (NN).

BACKGROUND

In the realm of machine learning and deep learning, tensor transposition is pivotal for data manipulation, playing a vital role in the preprocessing, data augmentation, and adaptation of data to fit neural network architectures. This process, which entails the rearrangement of multidimensional tensor dimensions, is critical for enhancing the training and inference efficiency of models. However, the computational infrastructure, including Central Processing Unit (CPUs) and Graphic Processing Unit (GPUs), currently falls short in efficiently addressing the intricate memory access and reshuffling demands that tensor transposition introduces.

This deficiency in hardware capability leads to significant inefficiencies, particularly as the complexity and dimensionality of tensors grow. The inability of hardware to adeptly handle the non-linear data access patterns required for tensor transposition results in less-than-optimal use of cache memory and an escalation in memory bandwidth needs. Such inefficiencies not only slow down the computational process but also widen the disconnect between existing hardware designs and the sophisticated requirements of contemporary machine learning tasks.

SUMMARY

Various embodiments of the present specification may include processors and systems for improving the memory access efficiency during tensor transposition operations.

In one aspect, a processor for accelerating tensor transposition operations in machine learning is described in this disclosure. The process may include an input tensor shift buffer; a staging buffer; and an output tensor shift buffer. The input tensor shift buffer is configured to: read an input tensor from an input memory, perform multiple cycles of input tensor shifting on the input tensor read from the input memory; and write a result of the multiple cycles of input tensor shifting into the staging buffer. The output tensor shift buffer is configured to: read the result of the multiple cycles of input tensor shifting from the staging buffer; perform multiple cycles of output tensor shifting on the result read from the staging buffer; and write a result of the multiple cycles of output tensor shifting to an output memory.

In some embodiments, the staging buffer includes a plurality of memory banks.

In some embodiments, the input tensor shift buffer is further configured to: during each cycle of the multiple cycles of input tensor shifting: read a sub-tensor of the input tensor from the input memory, and write the sub-tensor of the input tensor in a first shifting direction across the plurality of memory banks in the staging buffer.

In some embodiments, to read the sub-tensor of the input tensor, the input tensor shift buffer is further configured to: read a row of data of the input tensor from the input memory, and to write the sub-tensor of the input tensor in the first shifting direction across the plurality of memory banks in the staging buffer, the input tensor shift buffer is further configured to: write the row of data read from the input tensor in a column direction across the plurality of memory banks in the staging buffer.

In some embodiments, the output tensor shift buffer is further configured to: during each cycle of the multiple cycles of output tensor shifting: read a sub-tensor from the staging buffer, and write the sub-tensor in a second shifting direction into the output memory.

In some embodiments, to read the sub-tensor from the staging buffer, the output tensor shift buffer is further configured to: read a row of data from the staging buffer; and write the row of data from the staging buffer by shifting the row of data in the second shifting direction.

In some embodiments, a direction of the input tensor shifting is opposite to a direction of the output tensor shifting.

In some embodiments, the staging buffer includes a pair of buffers of a same size.

In some embodiments, where the pair of buffers include a first buffer and a second buffer that support parallel processing, and when the input tensor shift buffer is writing to the first buffer, the output tensor shift buffer is reading from the second buffer.

In some embodiments, the pair of buffers include a first buffer and a second buffer, and after the input tensor shift buffer writes a first result of the multiple cycles of input tensor shifting on a first input tensor into the first buffer, the output tensor shift buffer starts reading the first result from the first buffer to perform the multiple cycles of output tensor shifting; and while the output tensor is reading from the first buffer, the input tensor shift buffer starts writing a second result of the multiple cycles of input tensor shifting on a second input tensor into the second buffer, such that the input tensor shift buffer and the output tensor shift buffer avoid idle time.

In another aspect, a method for accelerating tensor transposition operations in machine learning is described in this disclosure. The method may include performing, using an input tensor shift buffer, multiple cycles of input tensor shifting on an input tensor read from an input memory; during each cycle of the multiple cycles of input tensor shifting, writing, using the input tensor shift buffer, a result of the cycle of input tensor shifting into a staging buffer; performing, using an output tensor shift buffer, multiple cycles of output tensor shifting on the results read from the staging buffer; and during each cycle of the multiple cycles of output tensor shifting, writing, using the output tensor shift buffer, a result of the cycle of output tensor shifting to an output memory.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAIL DESCRIPTION OF THE EMBODIMENTS

In machine learning, tensor operations such as transposition are essential but often hindered by several inefficiencies in existing solutions. Traditional methods typically rely on sequential processing, where tensors are read, transposed, and written back one element or row at a time. This results in significant latency and suboptimal performance, especially with large tensors. Single buffer systems used for intermediate storage create bottlenecks, causing idle times and underutilization of processing resources. Additionally, many methods lack sufficient parallelism, failing to leverage modern hardware architectures that excel at parallel operations.

Inefficient memory usage is another critical drawback, as frequent and redundant memory accesses increase bandwidth consumption and contention, particularly problematic for high-dimensional tensors. Furthermore, traditional approaches often do not account for directional constraints of tensor data, leading to complex and inefficient data movement patterns. These issues result in high latency and limited throughput, making the transposition process a bottleneck in the machine learning pipeline. This disclosure describes an efficient hardware design and method to enhance the performance of tensor transposition operations.

The concept of transposing extends beyond two-dimensional matrices to tensors, which are multidimensional arrays of numbers. Tensors are fundamental in various scientific fields, including physics, computer science, and engineering. A tensor's dimensions are often referred to as "axes" or "modes." While the transpose of a two-dimensional matrix involves flipping elements across its main diagonal, transposing a tensor with more than two dimensions involves rearranging these dimensions, a process which can significantly alter the tensor's structure and the relationship between its elements.

Figure 1A:
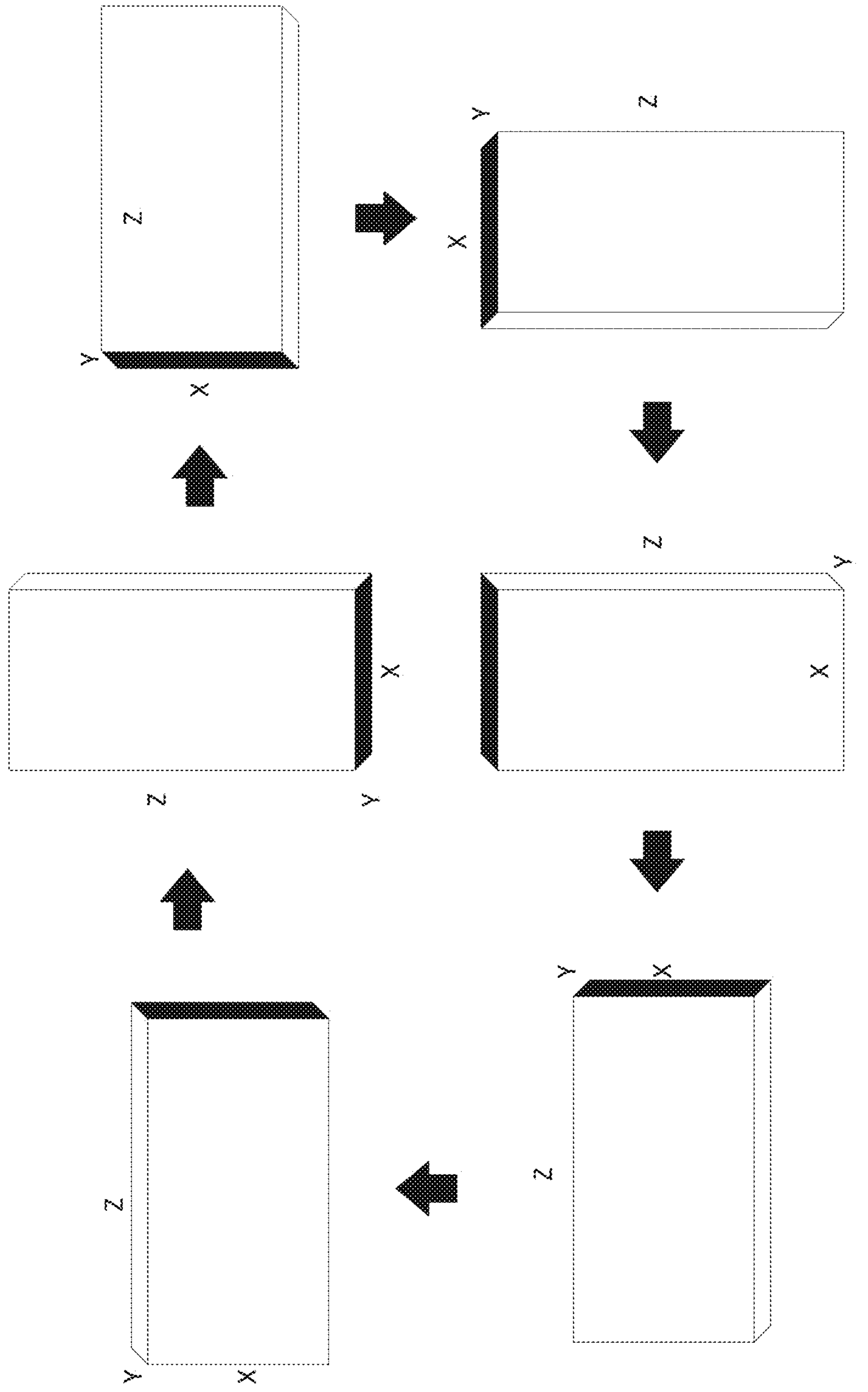
FIG. 1A illustrates an example tensor transposition in machine learning.

Transposition of a higher-dimensional tensor is defined by specifying a permutation of its dimensions. FIG. 1A illustrates an example tensor transposition in machine learning. The multi-dimensional tensor illustrated in FIG. 1A has three dimensions represented by (X, Y, Z), where X, Y, and Z denote the size of the tensor along each axis. In practice, each dimension X, Y, or Z may include more than one dimensions, meaning the multi-dimensional tensor could be more than three dimensions as illustrated in FIG. 1A.

Transposing the tensor in FIG. 1A might involve permuting these dimensions to (Z, X, Y), (Y, Z, X), or any other permutation, depending on the specific requirements of the operation being performed. This permutation changes how elements are indexed and accessed, effectively reshuffling the tensor's data.

The importance of tensor transposition is pronounced in fields like deep learning and computer graphics, where tensors are used to represent complex datasets such as images, videos, and multidimensional signal data. In these applications, transposing a tensor can be crucial for aligning data in a format expected by specific algorithms, for optimizing memory layout for faster computation, or for visualizing multidimensional data in a more interpretable manner.

One common application involves the transposition of a tensor representing an image. In computer memory, an image is often stored as a 3D tensor with dimensions corresponding to height, width, and color channels (e.g., RGB). Depending on the processing requirements, it may be necessary to transpose this tensor to align with the input format expected by image processing libraries or machine learning models, which might expect the color channels to be the first dimension rather than the last.

The flexibility in reordering the dimensions of a tensor during transposition allows for a versatile manipulation of multidimensional data, enabling more efficient data processing, analysis, and visualization. The specific manner in which tensor dimensions are permuted during transposition depends on the application's requirements, highlighting the operation's adaptability and broad utility across different scientific and engineering disciplines.

Figure 1B:
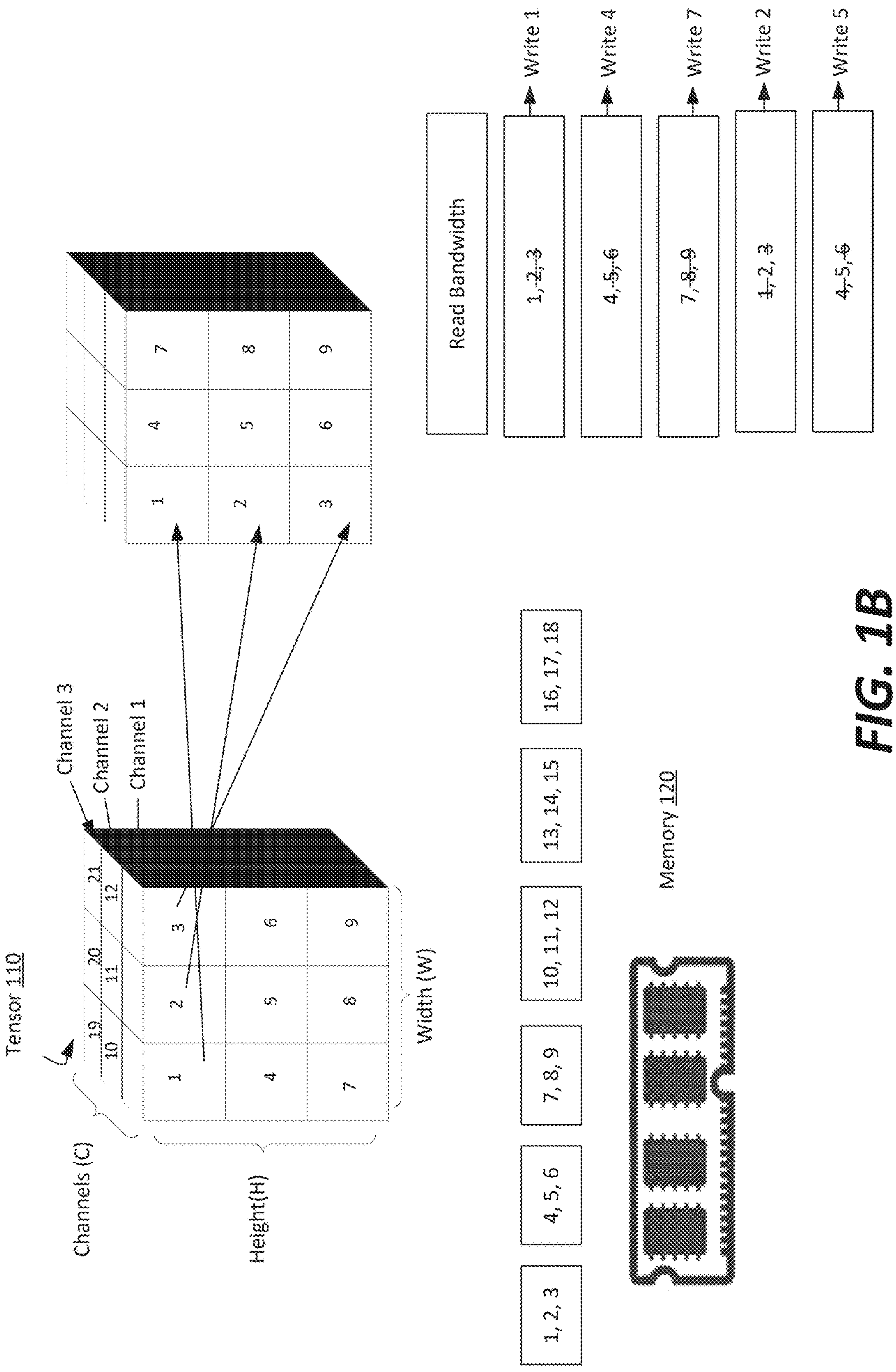
FIG. 1B illustrates the inefficient memory bandwidth utilization of existing processors for tensor transposition.

FIG. 1B illustrates the inefficient memory bandwidth utilization of existing processors for tensor transposition. As mentioned above, tensor transposition involves reordering the multi-dimensional tensors used widely in machine learning applications. When transposing tensors, traditional computing systems access memory by jumping to specific source addresses to fetch the required data segments and write to specific destination memory addresses directly. This process is inherently slow due to the non-sequential memory access patterns that arise when the axes of tensors are transposed. In the worst case, this might result in fetching only a single byte of effective data in each memory read cycle, leading to extremely low efficiency.

A naive approach to addressing this inefficiency is to increase the memory bandwidth, which allows the system to read as much data as possible in each cycle. However, this solution does not scale well with varying tensor transpositions, which may involve a large number of axes and each axis may have a large size. Since the tensor data is pre-stored in memory, transposing based on different axes results in varied and unpredictable memory access patterns. This variation makes it challenging to anticipate the amount of vector data needed for each transposition operation. Unless the entire tensor can be loaded into the cache simultaneously—which is impractical for large tensors—there will inevitably be inefficient reads during each cycle.

To illustrate, consider a scenario where a three-dimensional tensor [a, b, c] of size [64, 128, 512] bytes is stored such that every 512 bytes (the most-inner dimension) are stored sequentially in a memory with bandwidth of 512 bytes/cycle. If this tensor [a, b, c] is transposed to [b, a, c]—retaining the sequence of the inner-most dimension (called stationary axe) and transposing the two outer dimensions (a and b, called transposing axes)—the memory access pattern remains relatively efficient, allowing for the movement of 512 bytes of data per cycle.

Here, the large, sequentially stored sections of data can be read in blocks, maximizing throughput.

However, if the inner-most dimension is not the largest, as in a tensor [a, b, c] sized [64, 128, 64] bytes transposed to [b, a, c] (i.e., swapping a dimension and b dimension), the most efficient bandwidth drops to 64 bytes per read cycle. This smaller bandwidth significantly reduces the throughput compared to the first example (i.e., only 64/512, or ⅛ of the memory bandwidth is effectively utilized).

The problem exacerbates further if the transposition involves the two most-inner dimensions, like transposing [a, b, c] sized [64, 128, 64] to [a, c, b] (i.e., swapping b dimension and c dimension). In such cases, there is no large block of sequentially stored data to fetch, potentially reducing throughput to as low as 1 byte per cycle if the inner dimensions are swapped, which represents a massive drop in efficiency.

FIG. 1B illustrates the above-described worst-case scenario using a 3×3 tensor 110, in which the height axis (H), the width axis (W), and the channel axis (C) are equal in size, and the channel dimension is typically the outermost, and the width dimension is the innermost, though the height could be innermost with similar outcomes. In practical applications, the channel dimension (C) is usually divided into a plurality of channel groups. Each channel group includes multiple contiguous channels, and denoted as channel group dimension. For example, there could be 128 channels, and every 16 channels are grouped together as a channel group. Usually, the channel group dimension is the inner-most dimension and the data within the same channel group is stored sequentially in memory. However, for simplicity, it is assumed that the channel group dimension is 1, therefore the W dimension becomes the inner-most dimension. The elements of tensor 110 are labeled to aid in explaining the transposition process and memory storage.

Commonly in existing technology, tensors are stored in memory 120 with the innermost dimension stored continuously first, followed by the next most-inner dimension, and so forth. As depicted in FIG. 1B, the sequence (1, 2, 3) from the channel 0 and height 0 row is stored consecutively in memory 120, followed by (4, 5, 6), (7, 8, 9), and so on.

If the transposition of tensor 110 involves swapping the height and width axes, while keeping the channel axis unchanged, the elements in channel 0 would be rearranged across its main diagonal post-transposition, as visualized in FIG. 1B.

During this transposition, assuming the system can read 3 bytes per cycle from memory, it would typically read data continuously from the initial memory address to fill the 3-byte capacity and then write this data to the designated memory location. In this case, during the first reading cycle, tensor data (1, 2, 3) is fetched using the 3 bytes/cycle bandwidth. However, from this data, only the first byte (1) is effectively fetched because only (1) is needed for the first row of the target tensor after transposition, rendering the remaining bytes (2, 3) unnecessary. Similarly, in subsequent cycles, only one byte per cycle is effectively used, such as (4) from the next set, making the memory bandwidth utilization efficiency only one-third, or 33%.

The inventors of this application identified that the primary reason for the above inefficiency arises from the row-based tensor read from the source memory and row-based tensor write to the target memory when handling both transposing and stationary axes in tensor transposition. To overcome such technical limitations, this disclosure introduces a tensor transpose processor equipped with an inner transpose engine that executes row-based tensor reads and column-based tensor writes for the transposing axes. Additionally, an address scheduler is included to manage the read and write operations of tensor data for the stationary axes.

Figure 2:
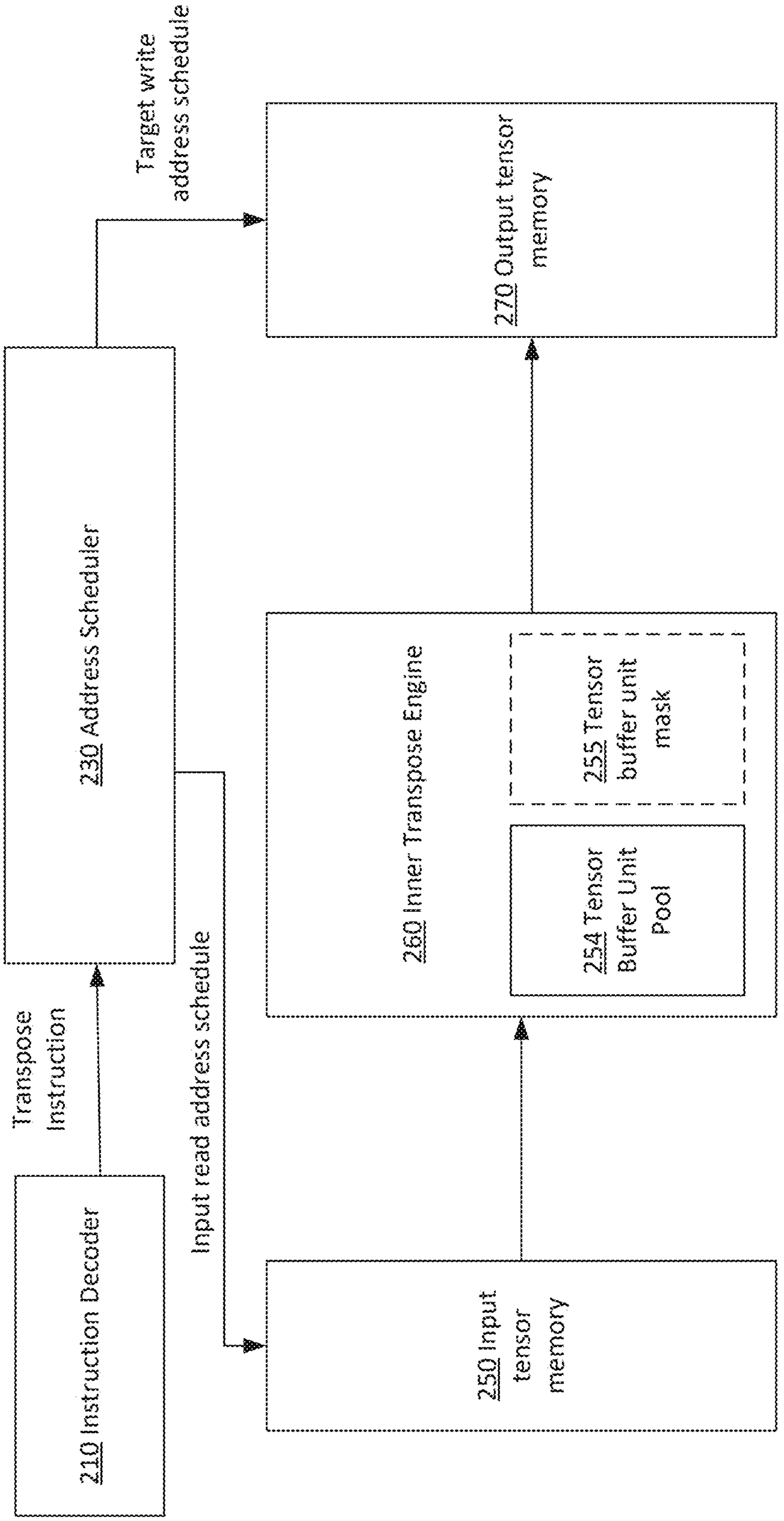
FIG. 2 illustrates an exemplary architectural diagram of a tensor transpose processor, in accordance with various embodiments.

FIG. 2 illustrates an exemplary architectural diagram of a tensor transpose processor (TTP), in accordance with various embodiments. The tensor transpose processor in FIG. 2 is simply used as an example to show the basic components for improving the memory efficiency for tensor transposition. Depending on the implementation, the TTP may include fewer, more, or alternative components.

In some embodiments, the TTP may include an instruction decoder for decoding tensor transpose instructions. The tensor transpose instruction may be received from machine learning computation algorithm, e.g., a convolution layer in deep neural networks. Each tensor transpose instruction may cause an input tensor to be transposed into a target tensor. The input tensor may include a plurality of axes (dimensions) and stored in an input tensor memory 250. The tensor transpose instruction may indicate the transposing axes and the stationary axes among the plurality of axes. The transposing axes may include two or more axes being transposed, and the stationary axes may include axes in the plurality of axes other than the transposing axes. Note that even the tensor data in the stationary axes are unchanged from a logic perspective, the actual memory storage locations for these tensor data may change during the transposition (e.g., when the stationary dimension is sandwiched by the transposing axes, the product of the sizes of all inner dimensions inside the stationary dimension is changed after the transposition).

In some embodiments, the TTP may further include an inner transpose engine 260 providing a pool 254 of tensor buffer units. These buffer units may be preconfigured to accommodate tensors of various sizes and serve as intermediate staging areas within the TTP for carrying out internal tensor transpositions before the final transposed tensor is produced. This configuration contrasts with existing methods where the input tensor is directly transposed from the input tensor memory and written into the output tensor memory. Instead, the TTP utilizes these internal buffer units to conduct in-buffer transpositions of sub-tensors extracted from the input tensor. Once these buffer units are filled, the intermediate transposition results are then transferred to the output tensor memory, significantly enhancing the efficiency of memory read/write bandwidth utilization.

In some embodiments, even though the sizes of the tensor buffer units may be pre-determined to accommodate the most popular tensor sizes, the pool 254 of tensor buffer units can be dynamically allocated to manage incoming tensor transpose instructions. This dynamic allocation allows for a seamless handling of operations: when a tensor buffer unit is occupied by a first tensor transpose instruction, subsequent requests for the same tensor buffer unit size do not need to await its release. Instead, an additional tensor buffer unit of identical size can be dynamically allocated using standard memory allocation interfaces, ensuring continuous processing without delay.

In some embodiments, the sizes of the tensor buffer units may be determined based on the maximum bandwidth of the tensor memory, e.g., the input tensor memory 250. For instance, assuming the maximum memory bandwidth is 512 bytes per reading cycle, the tensor buffer units may include two or more of the following sizes [8, 8, 64], [16, 16, 32], [32, 32, 16], [4, 4, 128], [2, 2, 256], and [1,1,512]. Here, the first two dimension represent the two outer-dimensions and the last dimension represent the most-inner dimension, such as in a typical HWCg (Height, Width, Channel Group).

In some embodiments, the product of two most-inner axes of tensor buffer units is equal to the maximum memory bandwidth, e.g., 512 in this example. This design is intended to read multiple sections of the continuously stored tensor data using the maximum memory bandwidth.

In some embodiments, each of the plurality of tensor buffer units includes a first axis, a second axis, and a third axis. The first axis equals to the second axis, and the third axis represents a dimension (e.g., a channel group dimension) that is smaller than a maximum memory bandwidth of the input tensor memory.

When the inner transpose engine 260 is instructed to transpose the input tensor (stored in the input tensor memory 250), it may first select a suitable tensor buffer unit to activate. The selection of the tensor buffer may be based on the size of the inner-most dimension of input tensor.

Using a commonly used Gc*H*W*Cg (Group of channel dimension, Height dimension, Width dimension, and channel group dimension) tensor as an example, the inner-most dimension is channel group dimension. Each channel group may be considered as a subsection of the channel dimension. Each channel group includes a plurality of channels, and tensor data within each channel group is stored sequentially in the input tensor memory. In this case, the selection of the suitable tensor buffer unit in the inner transpose engine 260 for activation may be based on the size of the channel group of the input tensor. That is, the tensor buffer unit being selected and activated may have a most-inner dimension of the same size as the size of the channel group of the input tensor.

After the selected tensor buffer unit is being activated, tensor data from the transposing axes of the input tensor are read row-wise from the input tensor memory 250 and are then written column-wise into the tensor buffer unit. This setup allows for the transposition of the tensor data from the transposing axes to occur directly within the tensor buffer unit, with all transposition activities confined to this buffer. When the tensor buffer unit becomes fully populated, the transposed tensor data are then directly transferred to the output tensor memory 270 without requiring any additional transposition steps.

Figure 3A:
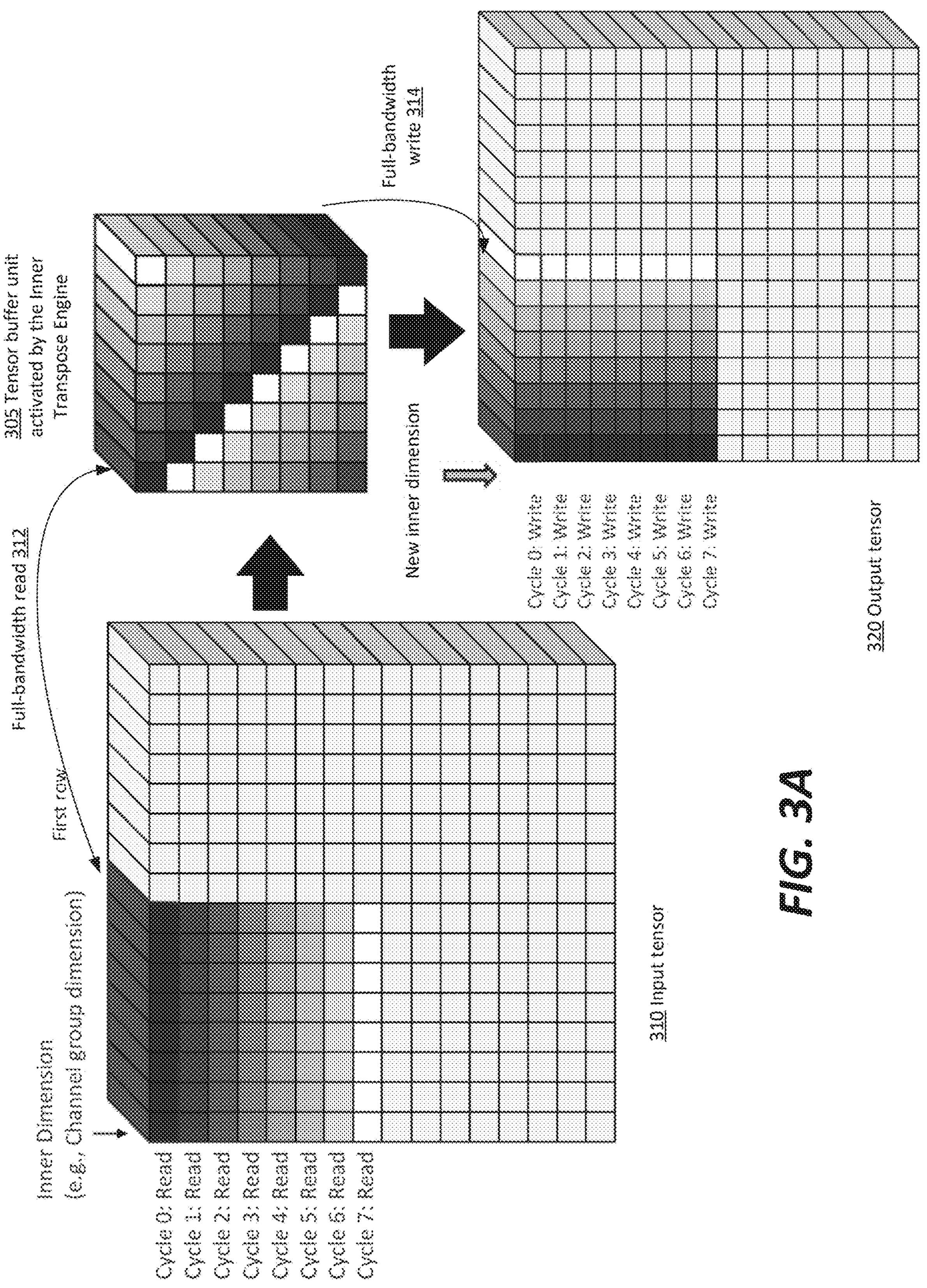
FIG. 3A illustrates an exemplary tensor transposition using the tensor transpose processor, in accordance with various embodiments.

The process of populating the tensor buffer unit requires several read cycles, with the number of these cycles dependent on the outermost dimension of the unit. Each read cycle involves the continuous read of tensor data from the input tensor memory 250, utilizing the full memory bandwidth, which matches the product of the two innermost dimensions of the tensor buffer unit (an example is shown in FIG. 3A).

Similarly, when the transposed tensor data are to be transferred from the tensor buffer unit to the output tensor memory 270, an equivalent number of write cycles are conducted. Each write cycle consists of transferring a plane of tensor data from the buffer unit to the output memory, also using the full memory bandwidth.

By this method, both reading from and writing to memory are optimized to fully utilize the available memory bandwidth, thereby enhancing the efficiency of memory access throughout the transposition process.

In certain use cases, it is possible that the input tensor may have a non-standard channel group size, resulting in a scenario where none of the tensor buffer units are perfectly suited for performing the inner transposition. To address this issue, in some embodiments, the inner transpose engine 260 may further includes a tensor buffer unit mask 255. This tensor buffer unit mask 255 may be configured to mask off part of a tensor buffer unit when the input tensor has a size that does not match with any of the tensor buffer units in the pool 254. That is, the tensor buffer unit mask 255 may be used to dynamically create a "suitable" tensor buffer unit. More details about this tensor mask are described in FIG. 4.

In some embodiments, the inner transpose engine 260 is configured to handle the transposing axes of the input tensor, i.e., the tensor data from the axes that are being transposed. To handle the tensor data movement from the stationary axes of the input tensor, the TTP may further include an address scheduler 230 configured to compute the target memory addresses for these tensor data from the stationary axes. This scheduler 230 is responsible for calculating the target memory addresses for the tensor data associated with the stationary axes. Given that the tensor structures before and after transposition are defined upon decoding the tensor transposition instruction, the process involves computing both the source and target memory addresses for the tensor data in the stationary axes, primarily through updates to the stride sizes.

In this disclosure, memory access (e.g., read/write) bandwidth of the input tensor memory 250 and the output tensor memory 270 refers to the capacity of a computing system to read from or write data to its memory within a single operational cycle, often measured in bytes per cycle. Essentially, this metric indicates the volume of data that can be efficiently transferred between the computer's memory and its processor within each clock cycle. The significance of memory bandwidth becomes particularly apparent in high-performance computing tasks, where the speed of reading from and writing to memory can greatly affect overall system performance.

FIG. 3A illustrates an exemplary tensor transposition using the tensor transpose processor (TTP), in accordance with various embodiments. This example is provided to aid in the understanding of the TTP and the transposition process outlined in FIG. 2.

As shown, the input tensor 310 includes a height dimension, a width dimension, and a channel group dimension. With the channel group dimension being the inner-most dimension, the tensor data on the channel group dimension is stored continuously in the memory.

To transpose the input tensor 310 using the TTP, a suitable tensor buffer unit 305 may be activated by the Inner Transpose Engine (e.g., 260 in FIG. 2) of the TTP. The selection of the suitable tensor buffer unit 305 may be based on the size of the channel group dimension of the input tensor 310. In this particular example, the size of the channel group dimension of the input tensor 310 is the same as the inner-most dimension of the tensor buffer unit 305.

Using the TTP to transpose the input tensor 310 may involve multiple rounds, each round including an inner transposition of a subtensor in the input tensor. Each of the subtensor being transposed during each round may have the same size of the activated tensor buffer unit 305.

Within each round of transposition, multiple read cycles may be performed to fully utilize the memory read bandwidth and the buffer size of the tensor buffer unit 305. For example, in FIG. 3A, the tensor buffer unit 305, with dimensions of height and width both set at 8, requires eight reading cycles to become fully populated, with each cycle involving the reading of 8 times the channel group dimension of tensor data continuously stored in the input tensor memory.

In some embodiments, the reading of the tensor data from the input tensor memory is row-based (e.g., reading one row at once), and the writing of the tensor data into the tensor buffer unit 305 is column-based (e.g., writing a column at once). For instance, the first row of the subtensor of the input tensor 310 (i.e., the dark-highlighted portion of the first plane in the input tensor 310, assuming that the channel group dimension is considered as one unit) may be read all together (since they are continuously stored in the memory). Here, the subtensor has the same size of the first plane of the tensor buffer unit 305.

Each read cycle involves reading continuously stored tensor data equal to the product of the channel group dimension and the width dimension of the tensor buffer unit 305. This configuration is set to match the maximum memory bandwidth, ensuring that each read cycle, denoted as "full bandwidth read 312" in FIG. 3A, fully utilizes the available memory bandwidth.

After reading a row of tensor data, it is written as a column in a shifting manner into the tensor buffer unit 305. As depicted in FIG. 3A, the first read row from input tensor 310 is written in the column direction but across all columns in tensor buffer unit 305. Once the tensor buffer unit 305 is fully populated after eight read cycles, the tensor data within has already been transposed. Then this transposed data is then transferred to the output tensor 320 over eight write cycles.

During each write cycle, each row of tensor data is read from the tensor buffer unit 305, and written all together in the row direction but in a shifting manner into the output tensor 320. Note that all the tensor data in the same row is already transposed, they can be written continuously in the output tensor. However, since the rows in the tensor buffer unit 305 were shifted during the loading process (e.g., from the internal memory to the tensor buffer unit 305), the writing of the transposed rows from the tensor buffer unit 305 into the output tensor 320 need to shift it back. A simplified example is illustrated in FIG. 3B.

Figure 3B:
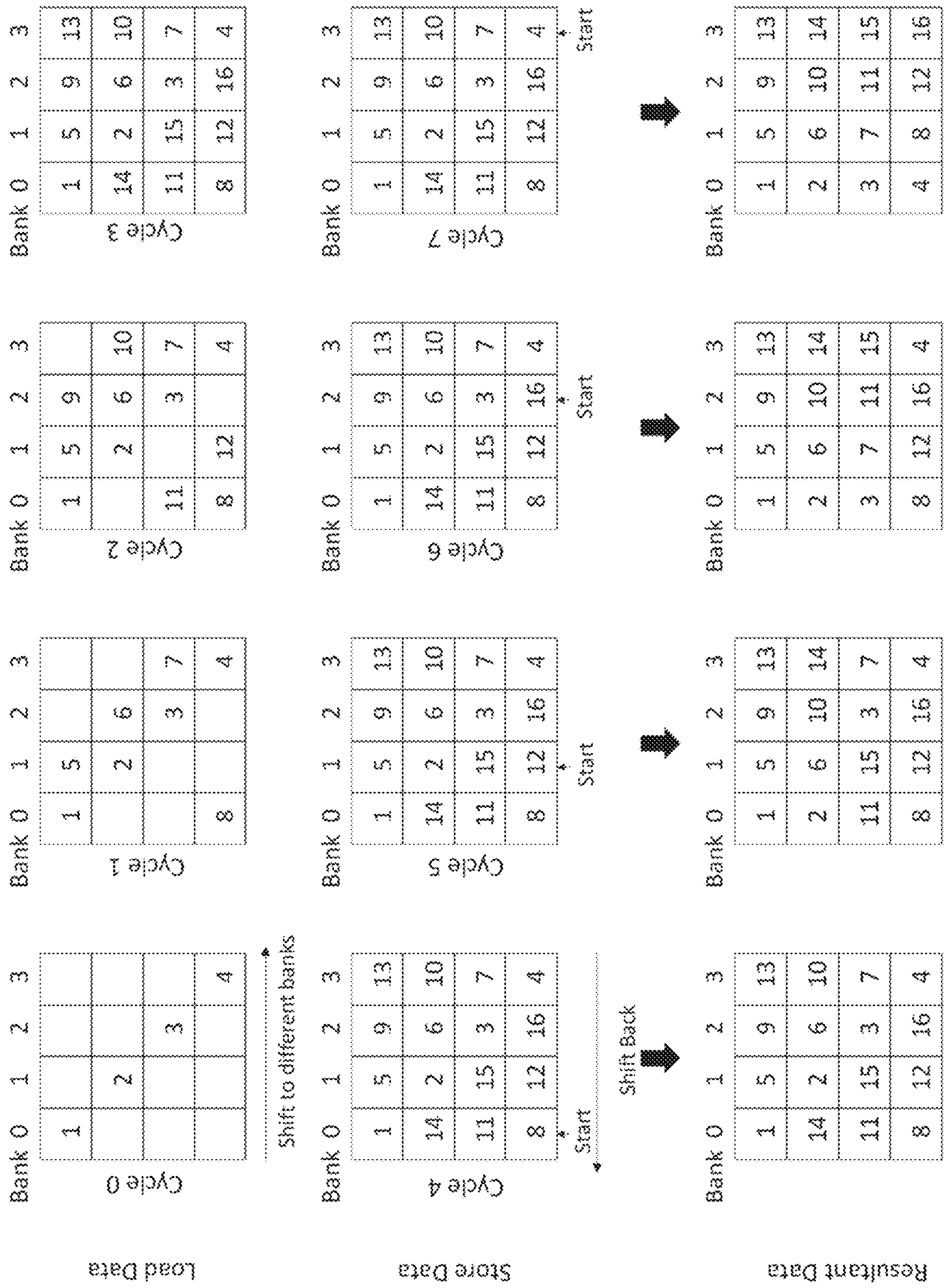
FIG. 3B illustrates an example loading and storing process to achieve the internal transposition in the tensor transpose processor, in accordance with various embodiments.

FIG. 3B illustrates an example loading and storing process to achieve the internal transposition in the tensor transpose processor, in accordance with various embodiments.

The term "bank" used in FIG. 3B refers to a distinct section or subdivision of the memory array in the context of SRAM. An SRAM can be divided into multiple banks to enhance parallelism and access speed. Each bank can be accessed independently, allowing for simultaneous read or write operations in different banks. In FIG. 3B, each column is represented as a bank for illustrative purposes. A person skilled in the art would understand how to apply the same process by treating each row as a bank.

To achieve high-bandwidth transpose operations, the internal transposition process (i.e., the load-and-store process) needs to ensure that the input data resides in different banks and that the output data also resides in different banks. This is accomplished by the "shifting" operations.

As shown, during the "load data" phase, cycle 0 includes reading a row of tensor data (1,2,3,4) and writing them into the internal buffer unit in the column direction and in a shifting manner across all the banks: the tensor data (1) is stored in bank 0, the tensor data (2) is stored in bank 1, the tensor data (3) is stored in bank 2, and the tensor data (4) is stored in bank 3. During cycle 1, the same process repeats for the next row of tensor data (5, 6, 7, 8), in which the tensor data (5) is stored in bank 1, the tensor data (6) is stored in bank 2, the tensor data (7) is stored in bank 3, and the tensor data (8) is stored in bank 0. The process continues to finish all four rows.

As shown, each row of tensor data from the input tensor is spread out into all the banks (to maximize parallelism), and the starting bank for loading each row is right shifted. After the "load data" phase, each row of the internal tensor buffer stores is already transposed. However, different rows of the internal tensor buffer are shifted during the loading process, so the rows need to be shifted back for alignment such that the resultant tensor is fully transposed and aligned.

In particular, during the "store data" phase, each cycle includes writing a row of tensor data from the internal tensor buffer to the output tensor. During $(i+1)_{th}$ cycle, the $(i+1)_{th}$ row from the internal tensor buffer is written into the $(i+1)_{th}$ row of the output tensor, but the starting bank in the $(i+1)_{th}$ cycle is right shifted from the starting bank in the $(i)_{th}$ cycle. As shown in FIG. 3B, cycle 4 includes writing the first tensor data to bank 0, and cycle 5 includes writing the first tensor data to bank 1. The "resultant data" in FIG. 3 shows that, after the shifted-loading process and the shifted-storing process, the input tensor is internally transposed and stored as the output tensor.

In conclusion, the multiple read cycles from the input tensor memory and the multiple write cycles into the output tensor memory are designed to make full use of the maximum memory bandwidth, facilitated by the specifically configured sizes of tensor buffer unit.

Figure 3C:
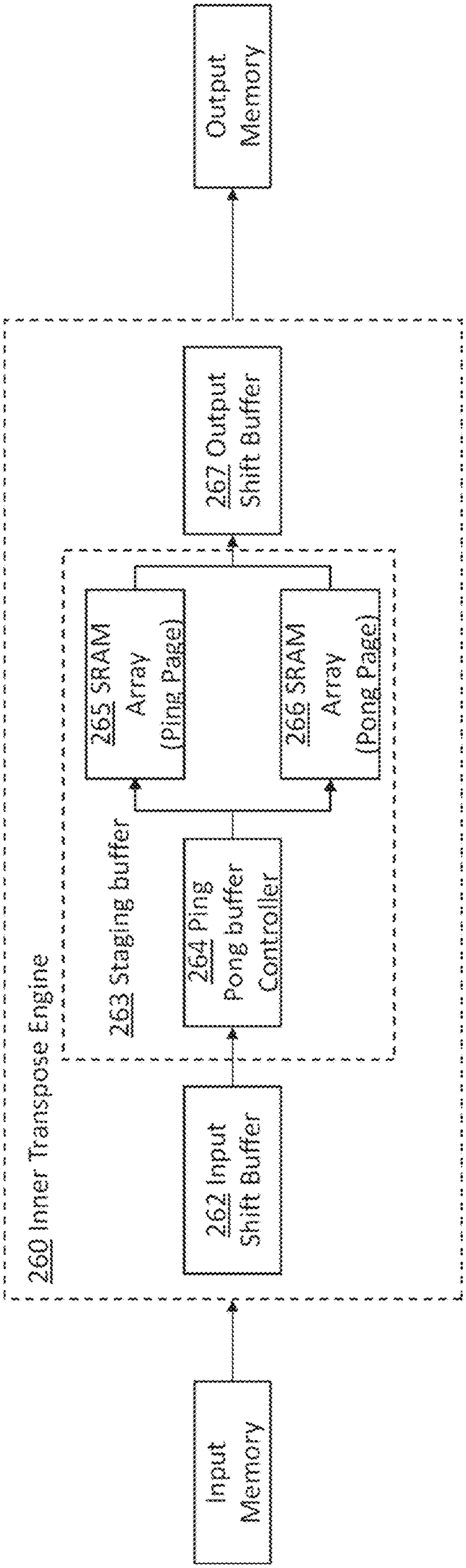
FIG. 3C illustrates an example architectural diagram of an inner transpose engine, in accordance with various embodiments.

FIG. 3C illustrates an example architectural diagram of an inner transpose engine 260, in accordance with various embodiments. While this inner transpose engine 260 is also illustrated in FIG. 2, FIG. 3C illustrates an example internal configuration of the inner transpose engine 260. In some embodiments, the inner transpose engine 260 may be understood as a standalone tensor transposition processing unit that works with existing input memory (storing tensors to be transposed) and output memory (storing transposed tensors).

In some embodiments, the inner transpose engine 260 may include an input shift buffer 262, a staging buffer 263, and an output shift buffer 267. The staging buffer 263 may include one or more buffers, depending on the implementation. Each buffer in the staging buffer 263 may include a plurality of memory banks. In the context of SRAM, a "memory bank" denotes a specific segment or subdivision within the buffer or memory array. By dividing SRAM into multiple banks, parallelism and access speed can be significantly improved. Each bank operates independently, facilitating simultaneous read or write operations across different banks. An "entry" in SRAM refers to a single storage location within a bank that holds a specific amount of data. Each entry is uniquely addressable, meaning it can be accessed, read, or written to by specifying its address within the bank.

To achieve high-bandwidth transpose operations, it is necessary to ensure that the input data is written into different banks in the staging buffer 263 and that the output data is also read from different banks. Therefore, internal shift operations are performed to distribute the data across multiple banks. This distribution allows for simultaneous access to multiple data entries, thereby enhancing processing efficiency and minimizing latency. The primary goal of the input shifting by the input shift buffer 262 and output shifting operations by the output shift buffer 267 is to leverage parallelism in data access and ensure continuous data flow during the transposition process.

In some embodiments, the input shift buffer 262 is a multi-function component configured to read data (e.g., an input tensor) from the input memory for transposition, perform multiple cycles of input tensor shifting on the data read from the input memory, and write a result of the multiple cycles of input tensor shifting into the staging buffer 263.

In some embodiments, the input shift buffer 262 performs the multiple cycles of input tensor shifting on the data read from the input memory in a sequential order, i.e., one cycle after another. During each cycle, the input shift buffer 262 reads a sub-tensor of the input tensor from the input memory, and write the sub-tensor in a first shifting direction across the plurality of memory banks in the staging buffer 263. In some embodiment, the sub-tensor here refers to a row of data in the input tensor, and the row of the data is written in a column direction across the plurality of memory banks in the staging buffer 267.

To better understand this input shifting process, attention is redirected to FIG. 3B. As shown in "load data" phase in FIG. 3B, a row of data (1, 2, 3, 4) is read from the input memory. During cycle 0, the row of data (1, 2, 3, 4) is written in a column direction and across the memory banks (banks 0, 1, 2, 3), with each bank receiving one element. Then during cycle 1, another row of data (5, 6, 7, 8) is read from the input memory, and is then written in the column direction and across the memory banks. Note that the writing of the shifted data crosses the memory banks, the writing is cyclic writing, which cycles through the memory banks in a sequential manner and wraps around to the first memory bank once the last memory bank in the sequence has been written to.

During the multiple cycles of input tensor shifting, the intermediate data is gradually stored in the staging buffer 263. It is important to note that this intermediate data does not yet represent the transposed version of the input tensor. The transposed version of the input tensor, also known as the output tensor, is generated only after the multiple cycles of output tensor shifting have been performed on the intermediate data.

In some embodiments, the output shift buffer 267 is also a multi-function component configured to read data (e.g., the result of the multiple cycles of input tensor shifting written by the input shift buffer 262) from the staging buffer 263, perform multiple cycles of output tensor shifting on the data read from the staging buffer 263, and write the result of multiple cycles of output tensor shifting to the output memory.

In some embodiments, the output shift buffer 267 performs the multiple cycles of output tensor shifting on the data read from the staging buffer 263 in a sequential order, i.e., one cycle after another. During each cycle, the output shift buffer 267 reads a sub-tensor from the staging buffer 263, and writes the sub-tensor in a second shifting direction into the output memory. In some embodiments, the sub-tensor here refers to a row of data from the staging buffer, which is written in a row-direction (i.e., still as a row) by shifting the row of data in the second shifting direction.

Referring back to FIG. 3B again, the multiple cycles of output tensor shifting are illustrated as the process of transferring data from the "store data" phase to the "resultant data" phase. During the first cycle (cycle 4 in FIG. 3B), the row of data (1, 5, 9, 13) is read from the staging buffer 263, and written into the output buffer by shifting in a direction that is opposite to the input shifting direction. In FIG. 3B, the input shifting direction is to the right, so the output shifting direction is to the left. For the first cycle (cycle 4 in FIG. 3B), the shifting step is 0, so the row of data (1, 5, 9, 13) is copied into the output buffer. During the second cycle (cycle 5 in FIG. 3B), the second row of data (14, 2, 6, 10) is read from the staging buffer 263, and shifted to the left by one element, becoming a row of data (2, 6, 10, 14) that is written into the output buffer.

In summary, the complete tensor transposition of the input tensor requires: (1) reading the input tensor in a row direction and writing the data in a column direction into the staging buffer 263; (2) shifting the column data across the plurality of memory banks in a first direction while writing the data; and (3) reading the tensor from the staging buffer, shifting it in a second direction opposite to the first direction, and writing the shifted data into the output memory.

While the above description outlines the general flow of the inner transpose engine, an improved hardware design of the staging buffer 263 can further enhance the efficiency of the inner transpose engine 260. In some embodiments, the staging buffer 263 includes a pair of identical buffers, also referred to as twin buffers or ping-pong buffers. As shown in FIG. 3C, two staging buffers 265 and 266 are implemented and orchestrated by a ping-pong buffer controller 263.

Figure 3D:
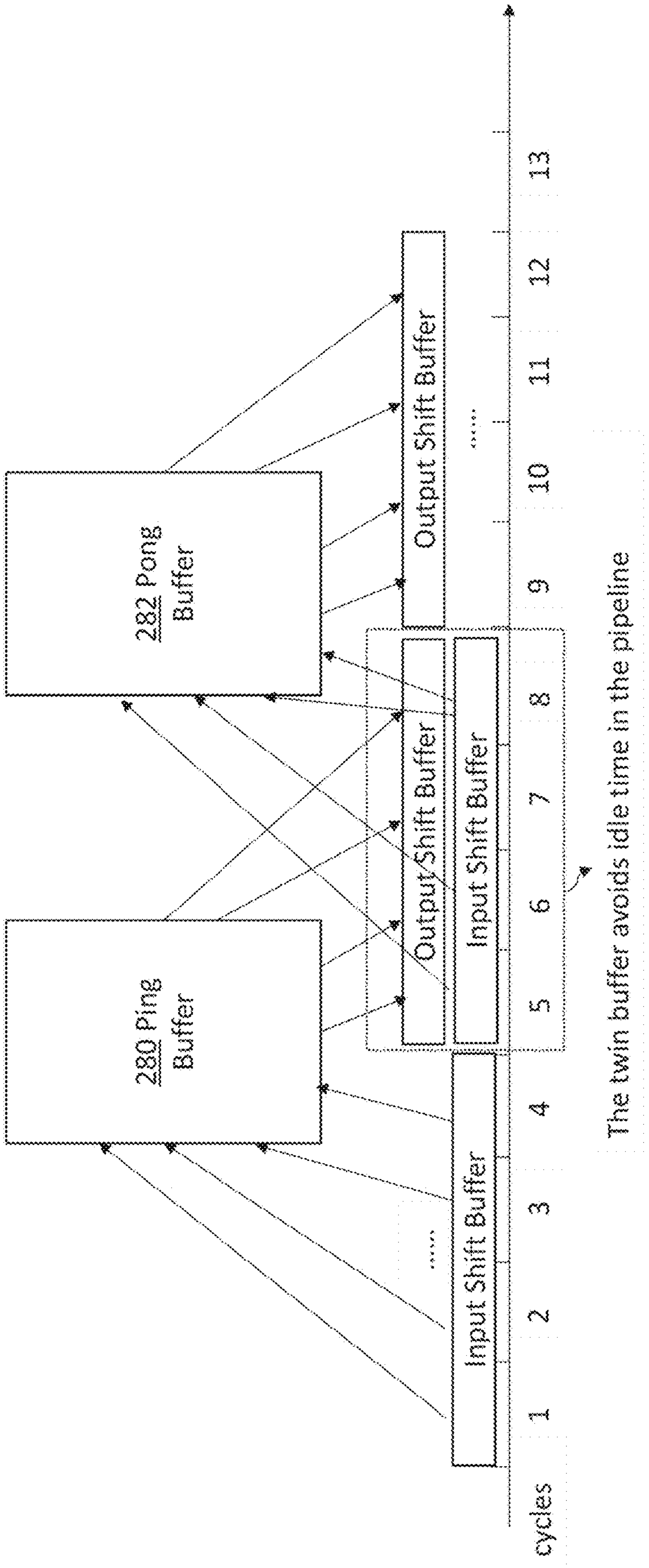
FIG. 3D illustrates a parallel processing pipeline in the inner transpose engine, in accordance with various embodiments.

The purpose of incorporating this pair of buffers is to enable parallel processing and prevent idle cycles in the input shifting buffer 262 and the output shifting buffer 267. As shown in FIG. 3B, both the input and output shifting processes require multiple cycles. With only one staging buffer, the input shifting buffer 262 would have to wait for the output shifting buffer 267 to finish reading the data from the stating buffer before starting the next round of input shifting operations. FIG. 3D illustrates an example process of using a pair of staging buffers to maximize the efficiency of the inner transpose engine 260.

FIG. 3D illustrates a parallel processing pipeline in the inner transpose engine, in accordance with various embodiments. As shown, a pair of staging buffers, e.g., the ping buffer 280 and the pong buffer 282 are configured to facilitate a parallel tensor transposition.

For simplicity, FIG. 3D uses an example to demonstrate how the pair of buffers 280 and 282 prevent idle cycles in the tensor transposition process. During each cycle from cycle 5 to cycle 8, the output shift buffer reads tensor data (i.e., the intermediate tensor data written by the input shift buffer during cycles 1-4) from the ping buffer 280 to perform output shifting. In this period, the ping buffer cannot receive new data from the input shift buffer until the output shift buffer finishes. However, with the pong buffer 282, the input shift buffer can start working on the next sub-tensor of the input tensor, performing input shifting and writing to the pong buffer 282. Then during cycles 9-12, the output shift buffer can consume the data from the pong buffer 282, and the input shift buffer can start working on the next sub-tensor using the ping buffer 280. This way, both the input shift buffer and the output shift buffer remain busy. This pattern continues, avoiding idle cycles and ensuring efficient processing.

Figure 4:
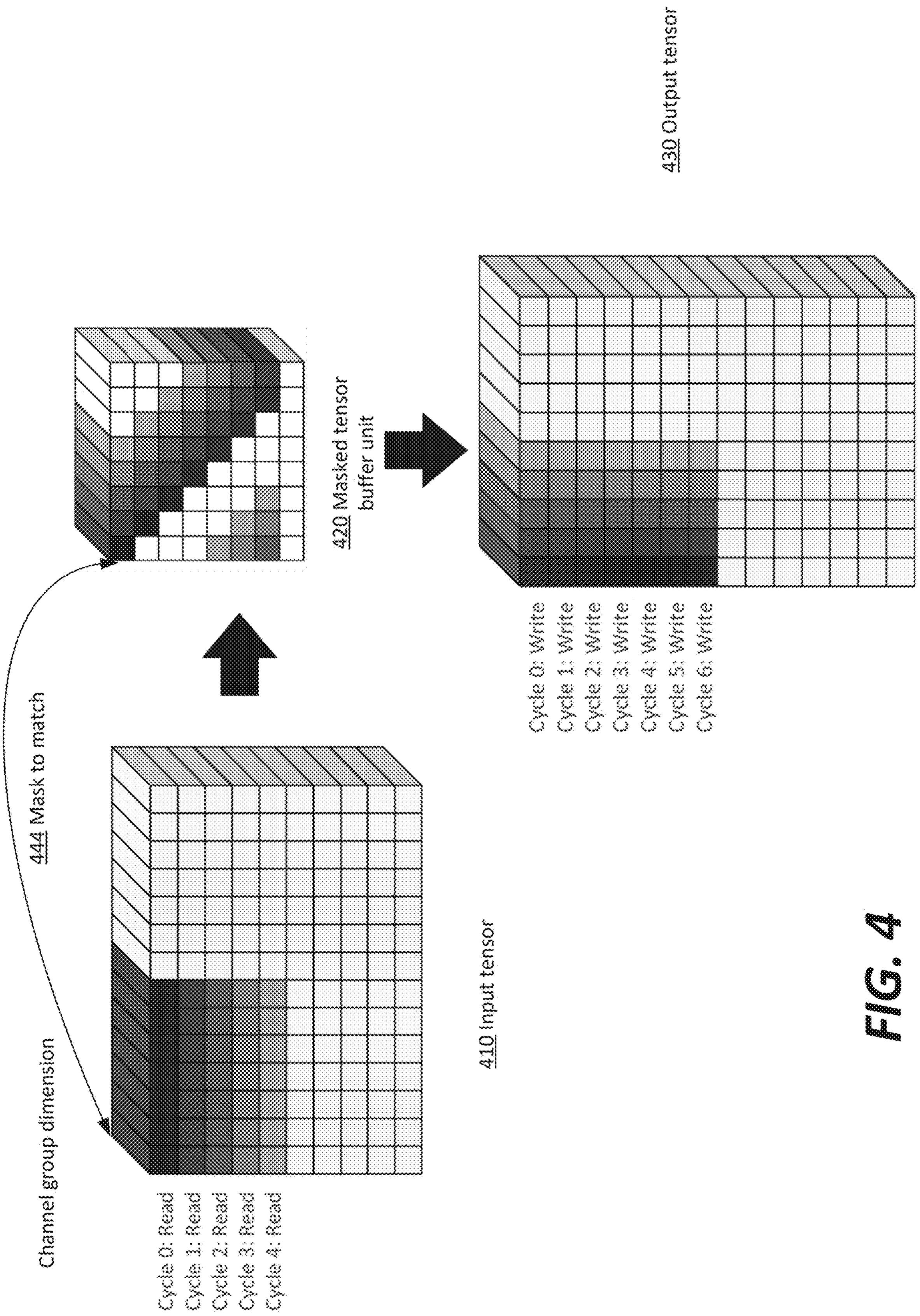
FIG. 4 illustrates another exemplary tensor transposition using the tensor transpose processor, in accordance with various embodiments.

FIG. 4 illustrates another exemplary tensor transposition using the tensor transpose processor (TTP), in accordance with various embodiments. In some embodiments, the pre-configured tensor buffer units in the TTP are to accommodate the standard tensor sizes (more specifically, the standard channel group sizes). However, when the input tensor 410 has an irregulate channel group size, there is no organic tensor buffer units to match with the input tensor 410.

In some embodiments, if none of the organic tensor buffer units have an inner-most (i.e., the channel group) dimension that matches the size of the channel group of the input tensor 410, an approximate tensor buffer unit might be selected to carry out the inner transposition within the TTP. This selected approximate tensor buffer unit would have the smallest inner-most dimension that exceeds the size of the channel group of the input tensor 410.

After selecting the approximate tensor buffer unit, tensor masks may be applied to the approximate tensor buffer unit to obtain a masked tensor buffer unit 420, such that the masked tensor buffer unit 420 has the inner-most dimension of the same size as the size of the channel group dimension of the input tensor 410 (denoted as "mask to match" 444 in FIG. 4).

Using the masked tensor buffer unit 420, the multi-cycle reads from the input tensor and the multi-cycle writes into the output tensor may performed just as the way described in FIG. 3A. Even though the approximate tensor buffer unit has some buffer spaces masked out and thus not fully utilized, the product of the (channel group dimension)* (width dimension) of the masked tensor buffer unit 420 may still be configured as the maximum memory bandwidth. This way, each read cycle and write cycle may still fully utilize the memory bandwidth.

Figure 5A:
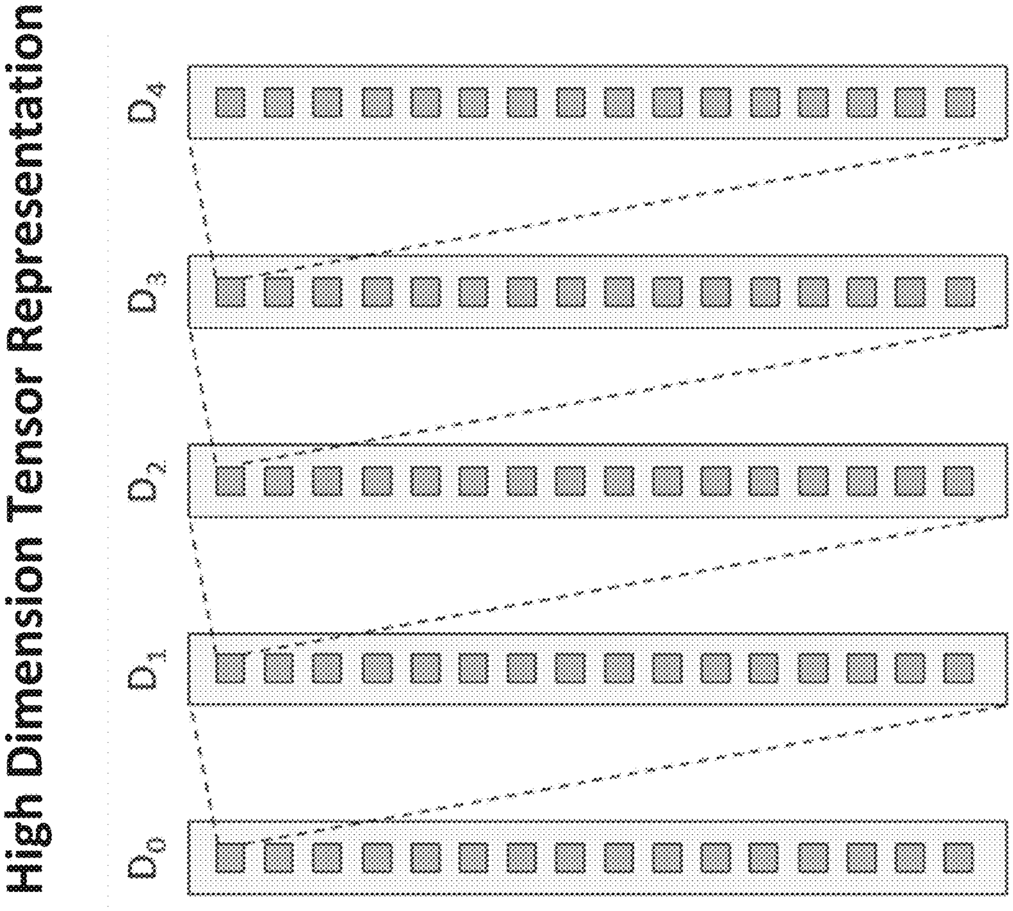
FIG. 5A illustrates an example high dimension tensor representation, facilitating the descriptions of FIGS. 5B to 5D.
Figure 5B:
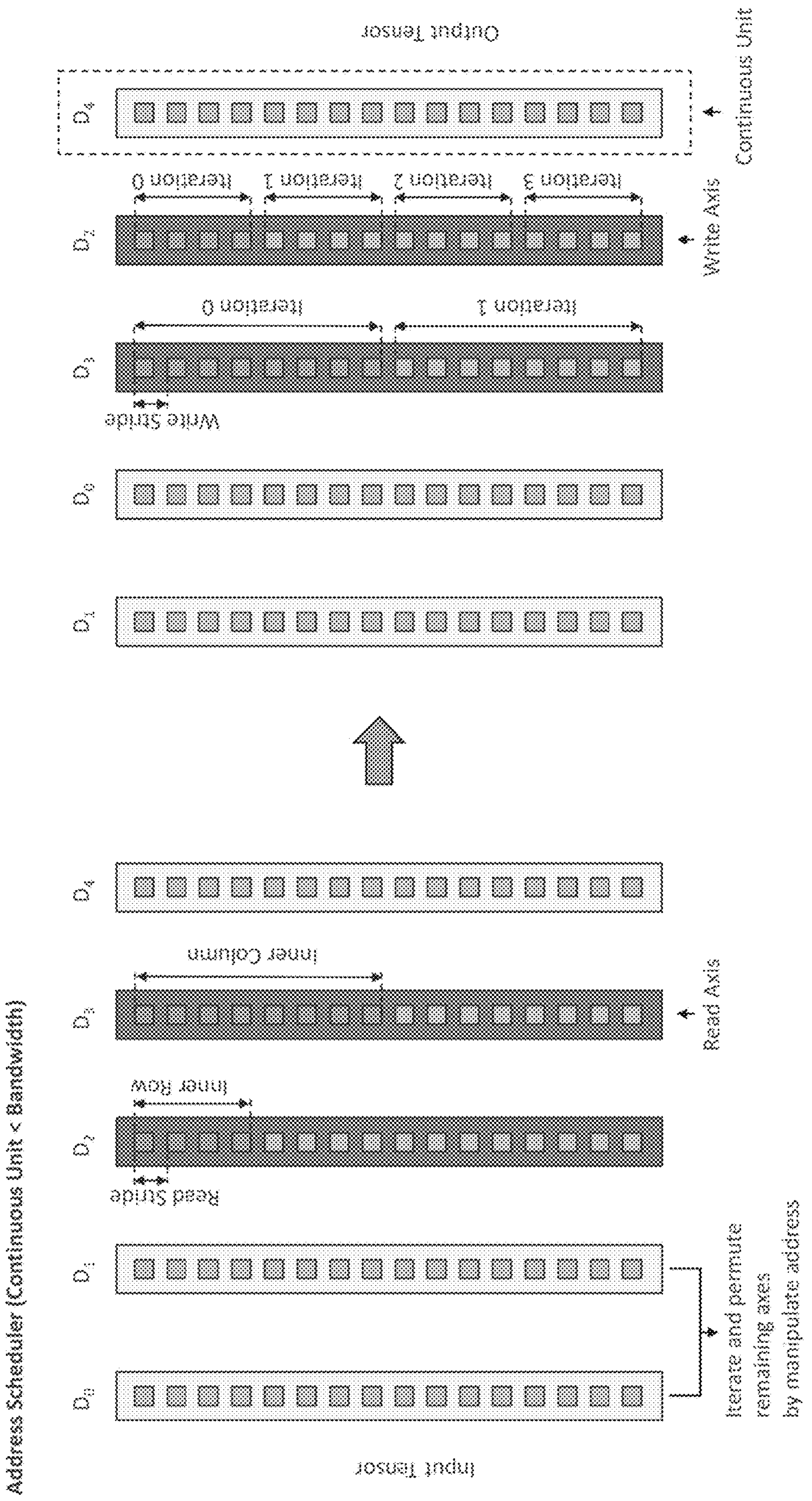
FIG. 5B illustrates an exemplary tensor transposition using the tensor transpose processor when the continuous unit of the tensor is smaller than the memory bandwidth, in accordance with various embodiments.
Figure 5C:
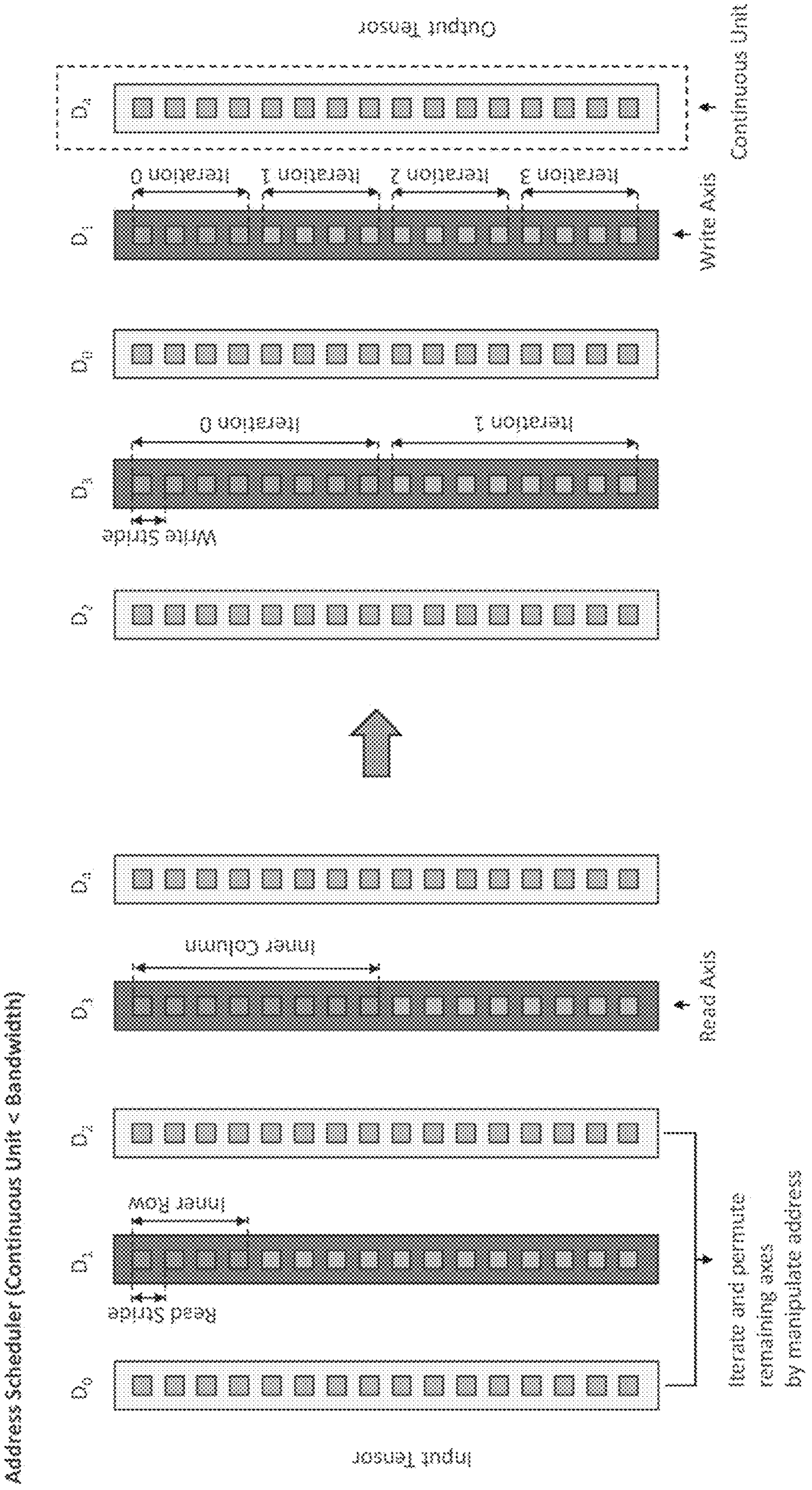
FIG. 5C illustrates another exemplary tensor transposition using the tensor transpose processor when the continuous unit of the tensor is smaller than the memory bandwidth, in accordance with various embodiments.
Figure 5D:
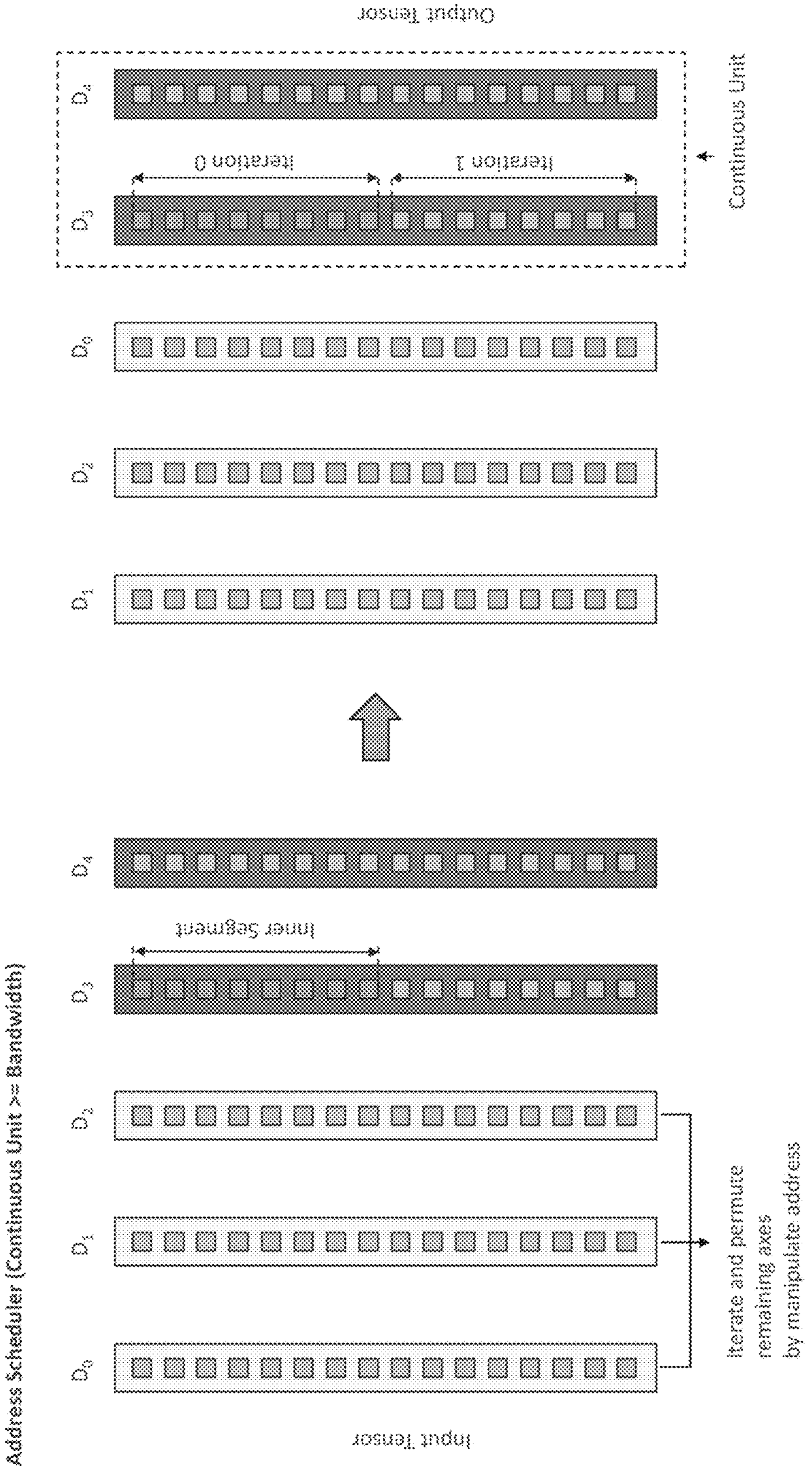
FIG. 5D illustrates an exemplary tensor transposition using the tensor transpose processor when the continuous unit of the tensor is equal to or greater than the memory bandwidth, in accordance with various embodiments.

FIG. 5A illustrates an example of a high-dimensional tensor representation, providing a foundation for the descriptions in FIGS. 5B to 5D. While low-dimensional tensors can be represented as vectors or matrices, high-dimensional tensor representations are often less intuitive. To simplify, FIG. 5A (and the subsequent FIGS. 5B-5D) employs a straightforward method to represent a 5-dimensional tensor, where each small square symbolizes nested data of the subsequent dimension. This representation method effectively uses a tree structure to depict the high-dimensional tensor.

FIG. 5B illustrates an exemplary tensor transposition using the tensor transpose processor when the continuous unit of the tensor is smaller than the memory bandwidth, in accordance with various embodiments. Since the continuous unit of the tensor is smaller than the memory bandwidth, multiple continuous units may be read during the same iteration to fully utilize the memory bandwidth.

In FIG. 5B, the "continuous unit" refers to the continuous data within the tensor that is continuously stored in the memory. In general, the inner-most dimension of the tensor is continuously stored (e.g., D4 dimension in FIG. 5B), but the continuous unit may include more than one rounds of the inner-most dimension of the tensor.

In particular, the source tensor on the left part of FIG. 5B ($D_0D_1D_2D_3D_4$) is being transposed into the destination tensor ($D_1D_0D_3D_2D_4$) on the right part of FIG. 5B. The transposing axes are $D_2$ and $D_3$, and the other axes ($D_0$ and $D_1$) are stationary, D4 is the continuous unit. The continuous unit D4 is smaller than the memory bandwidth.

In this case, the transposition involves using a selected tensor buffer unit to read multiple "inner column" from the $D_3$ of the source tensor. The number of continuous "inner columns" being read is determined by the "read stride" in the $D_2$ dimension (i.e., the dimension right before the $D_3$ of the input tensor). The product of the "read stride" and the "inner column" is equal to the memory bandwidth.

During the write cycles, multiple "inner column" are read from the tensor buffer unit and written into the output buffer. The number of "inner column" being read from the tensor buffer is determined by the "write stride" in the new $D_3$ dimension (i.e., the dimension right before the inner-most dimension $D_2$ of the transposed tensor). The product of the "write stride" and the "write iteration" (e.g., write iteration 0 and write iteration 1 in the new $D_3$ dimension) is equal to the memory bandwidth.

During this process, the dimensions $D_0$ and $D_1$ in the input tensor do not go through the inner transposition using the inner transpose engine. Instead, the permutation of these two dimensions are performed by the address scheduler manipulating the memory addresses.

FIG. 5C illustrates another exemplary tensor transposition using the tensor transpose processor when the continuous unit of the tensor is smaller than the memory bandwidth, in accordance with various embodiments. The example in FIG. 5C involves transposing (swapping) non-contiguous dimensions $D_1$ and $D_3$ in the input tensor. Again, the continuous unit is the dimension $D_4$. In the input tensor, the read stride in the $D_1$ dimension times the "inner column" would equal to the memory bandwidth. Similarly, in the output (transposed) tensor, the write stride in the $D_3$ dimension times the "write iteration" (e.g., write iteration 0 and write iteration 1 in the new $D_3$ dimension) is equal to the memory bandwidth.

During this process, the dimensions $D_0$ and $D_2$ in the input tensor do not go through the inner transposition using the inner transpose engine. Instead, the permutation of these two dimensions are performed by the address scheduler manipulating the memory addresses.

FIG. 5D illustrates an exemplary tensor transposition using the tensor transpose processor when the continuous unit of the tensor is equal to or greater than the memory bandwidth, in accordance with various embodiments. When the continuous unit is equal to or greater than the memory bandwidth, the memory bandwidth would be fully utilized in every read cycle and writhe cycle.

During this process, the dimensions $D_0$, $D_1$, and $D_2$ in the input tensor do not go through the inner transposition using the inner transpose engine. Instead, the permutation of these three dimensions are performed by the address scheduler manipulating the memory addresses.

Figure 6A:
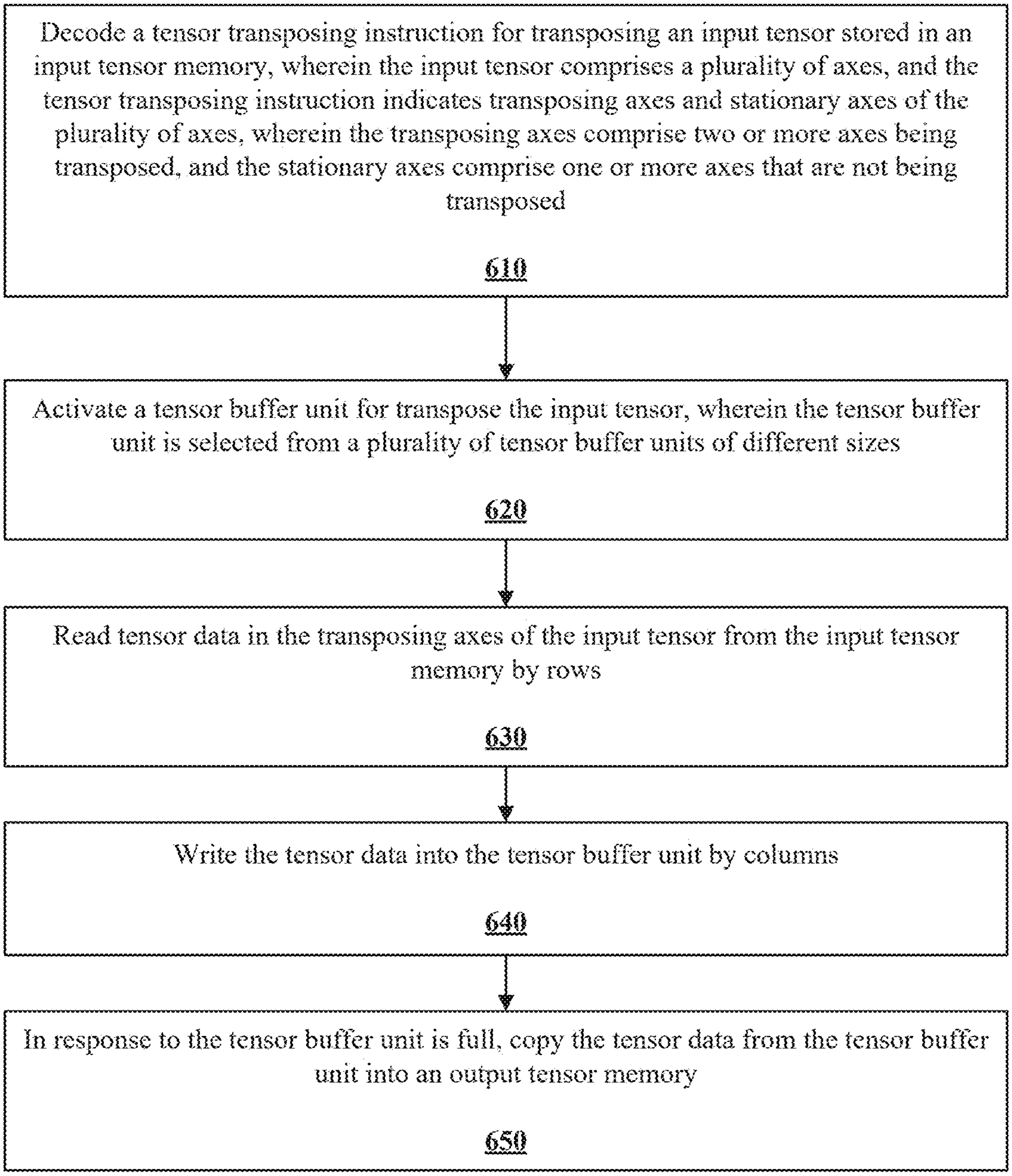
FIG. 6A illustrates an exemplary method of tensor transposition using the tensor transpose processor, in accordance with various embodiments.

FIG. 6A illustrates an exemplary method 600 of tensor transposition using the tensor transpose processor, in accordance with various embodiments. In some implementations, one or more process blocks of FIG. 6 A may be performed by a tensor transpose processor.

As shown in FIG. 6 A, process 600 may include decoding a tensor transpose instruction for transposing an input tensor stored in an input tensor memory, where the input tensor may include a plurality of axes, and the tensor transpose instruction indicates transposing axes and stationary axes of the plurality of axes, where the transposing axes may include two or more axes being transposed, and the stationary axes may include one or more axes that are not being transposed (block 610). For example, the tensor transpose processor may decode a tensor transpose instruction for transposing an input tensor stored in an input tensor memory, where the input tensor may include a plurality of axes, and the tensor transpose instruction indicates transposing axes and stationary axes of the plurality of axes, where the transposing axes may include two or more axes being transposed, and the stationary axes may include one or more axes that are not being transposed, as described above.

As also shown in FIG. 6 A, process 600 may include activating a tensor buffer unit for transpose the input tensor, where the tensor buffer unit is selected from a plurality of tensor buffer units of different sizes (block 620). For example, the tensor transpose processor may activate a tensor buffer unit for transpose the input tensor, where the tensor buffer unit is selected from a plurality of tensor buffer units of different sizes, as described above.

As further shown in FIG. 6 A, process 600 may include reading tensor data in the transposing axes of the input tensor from the input tensor memory by rows (block 630). For example, the tensor transpose processor may read tensor data in the transposing axes of the input tensor from the input tensor memory by rows, as described above.

As also shown in FIG. 6 A, process 600 may include writing the tensor data into the tensor buffer unit by columns (block 640). For example, the tensor transpose processor may write the tensor data into the tensor buffer unit by columns, as described above. As further shown in FIG. 6, process 600 may include in response to the tensor buffer unit is full, copy the tensor data from the tensor buffer unit into an output tensor memory (block 650). For example, the tensor transpose processor may in response to the tensor buffer unit is full, copy the tensor data from the tensor buffer unit into an output tensor memory, as described above.

Although FIG. 6A shows example blocks of process 600, in some implementations, process 600 may include additional blocks, fewer blocks, different blocks, or differently arranged blocks than those depicted in FIG. 6A. Additionally, or alternatively, two or more of the blocks of process 600 may be performed in parallel.

Figure 6B:
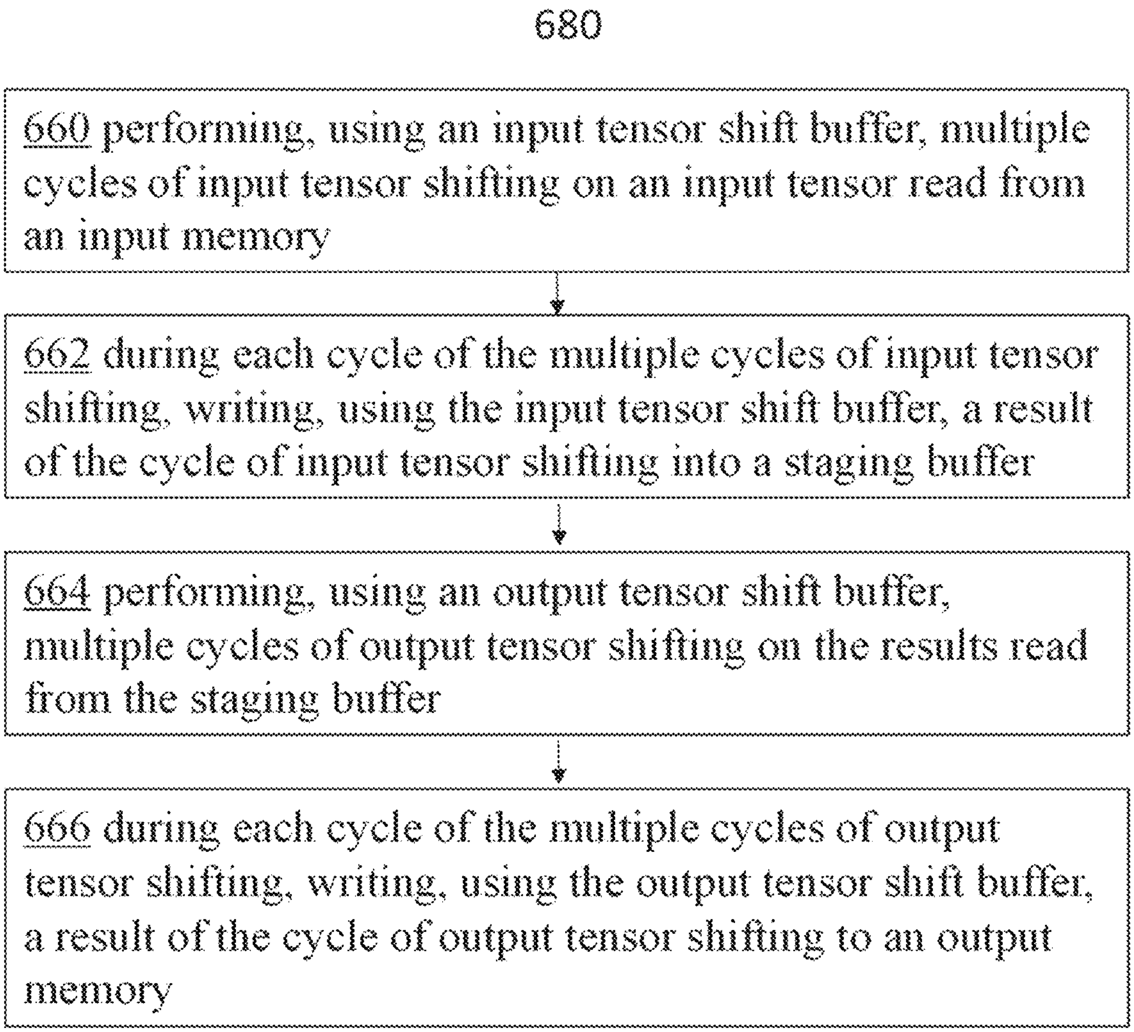
FIG. 6B illustrates another exemplary method of tensor transposition using the tensor transpose processor, in accordance with various embodiments.

FIG. 6B illustrates another exemplary method 680 of tensor transposition using the tensor transpose processor, in accordance with various embodiments. The blocks (steps) in FIG. 6B are for illustrative purposes. Depending the implementation, process 680 may include additional blocks, fewer blocks, different blocks, or differently arranged blocks than those depicted in FIG. 6B. Additionally, or alternatively, two or more of the blocks of process 680 may be performed in parallel.

Block 660 includes performing, using an input tensor shift buffer, multiple cycles of input tensor shifting on an input tensor read from an input memory.

Block 662 includes, during each cycle of the multiple cycles of input tensor shifting, writing, using the input tensor shift buffer, a result of the cycle of input tensor shifting into a staging buffer. In some embodiments, the staging buffer comprises a plurality of memory banks.

Block 664 includes performing, using an output tensor shift buffer, multiple cycles of output tensor shifting on the results read from the staging buffer.

Block 666 includes during each cycle of the multiple cycles of output tensor shifting, writing, using the output tensor shift buffer, a result of the cycle of output tensor shifting to an output memory.

In some embodiments, the performing the multiple cycles of input tensor shifting on the input tensor read from the input memory includes: during each cycle of the multiple cycles of input tensor shifting: reading a sub-tensor of the input tensor from the input memory, and shifting the sub-tensor of the input tensor in a first shifting direction across the plurality of memory banks when writing to the staging buffer.

In some embodiments, the sub-tensor read from the input memory includes a row of data of the input tensor, and the writing the result of the cycle of input tensor shifting into the staging buffer includes: writing the row of data read from the input tensor in a column direction across the plurality of memory banks in the staging buffer.

In some embodiments, the performing the multiple cycles of output tensor shifting on the results read from the staging buffer includes: during each cycle of the multiple cycles of output tensor shifting: reading a sub-tensor from the staging buffer, and shifting the sub-tensor in a second shifting direction when writing to the output memory.

In some embodiments, the sub-tensor read from the staging buffer includes a row of data read from the staging buffer, and the writing the result of the cycle of output tensor shifting to an output memory includes: write the row of data from the staging buffer by shifting the row of data in the second shifting direction.

In some embodiments, a direction of the input tensor shifting is opposite to a direction of the output tensor shifting.

In some embodiments, the staging buffer includes a pair of buffers of a same size.

In some embodiments, the pair of buffers include a first buffer and a second buffer that support parallel processing, and when the input tensor shift buffer is writing to the first buffer, the output tensor shift buffer is reading from the second buffer.

In some embodiments, the pair of buffers include a first buffer and a second buffer, and after the input tensor shift buffer writes a first result of the multiple cycles of input tensor shifting on a first input tensor into the first buffer, the output tensor shift buffer starts reading the first result from the first buffer to perform the multiple cycles of output tensor shifting; and while the output tensor is reading from the first buffer, the input tensor shift buffer starts writing a second result of the multiple cycles of input tensor shifting on a second input tensor into the second buffer, such that the input tensor shift buffer and the output tensor shift buffer avoid idle time.

Figure 7:
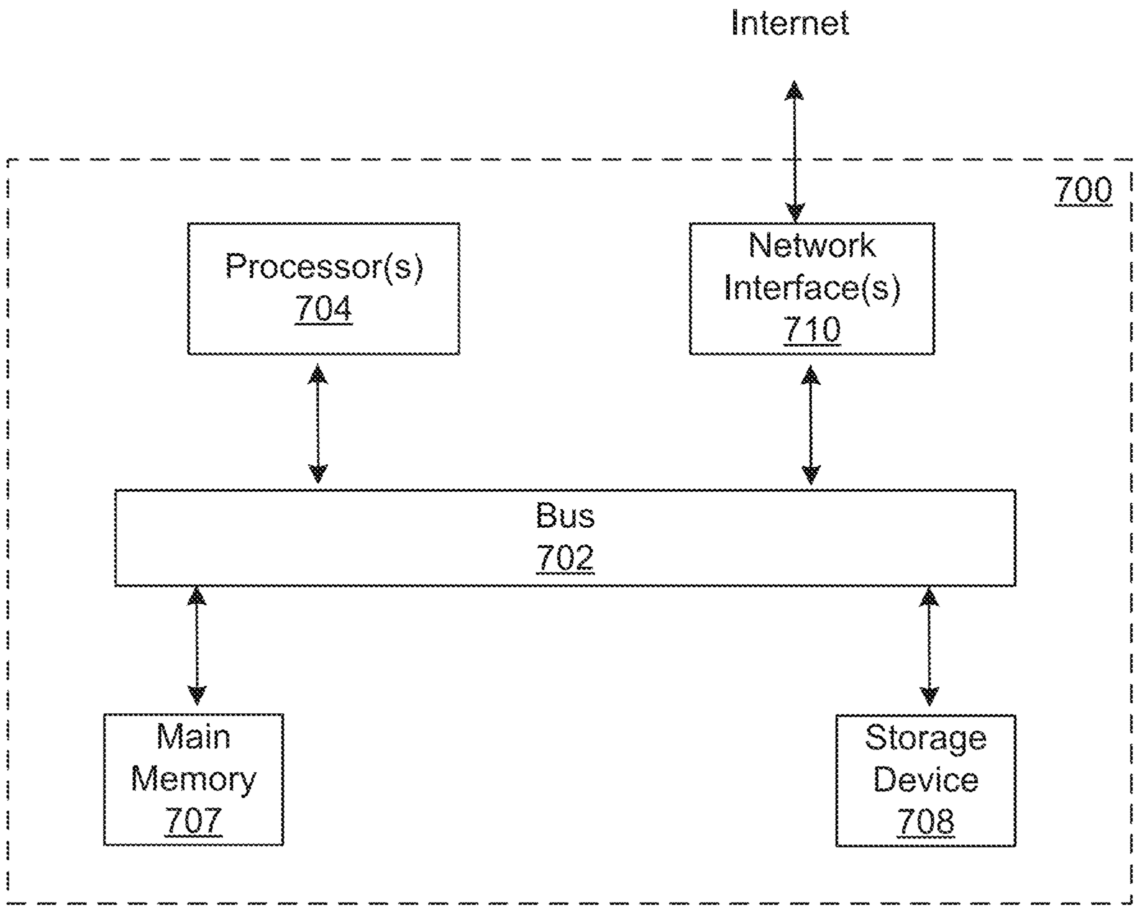
FIG. 7 illustrates an example computer system in which any of the embodiments described herein may be implemented.

FIG. 7 illustrates an example computing device in which any of the embodiments described herein may be implemented. The computing device may be used to implement one or more components of the systems and the methods shown in FIGS. 1-6. The computing device 700 may comprise a bus 702 or other communication mechanisms for communicating information and one or more hardware processors 704 coupled with bus 702 for processing information. Hardware processor(s) 704 may be, for example, one or more general-purpose microprocessors.

The computing device 700 may also include a main memory 707, such as random-access memory (RAM), cache and/or other dynamic storage devices, coupled to bus 702 for storing information and instructions to be executed by processor(s) 704. Main memory 707 also may be used for storing temporary variables or other intermediate information during execution of instructions to be executed by processor(s) 704. Such instructions, when stored in storage media accessible to processor(s) 704, may render computing device 700 into a special-purpose machine that is customized to perform the operations specified in the instructions. Main memory 707 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 700 may implement the techniques described herein using customized hard-wired logic, one or more ASICs or FPGAs, firmware and/or program logic which in combination with the computing device may cause or program computing device 700 to be a special-purpose machine. According to one embodiment, the techniques herein are performed by computing device 700 in response to processor(s) 704 executing one or more sequences of one or more instructions contained in main memory 707. Such instructions may be read into main memory 707 from another storage medium, such as storage device 708. Execution of the sequences of instructions contained in main memory 707 may cause processor(s) 704 to perform the process steps described herein. For example, the processes/methods disclosed herein may be implemented by computer program instructions stored in main memory 707. When these instructions are executed by processor(s) 704, they may perform the steps as shown in corresponding figures and described above. In alternative embodiments, hard-wired circuit may be used in place of or in combination with software instructions.

The computing device 700 also includes a communication interface 710 coupled to bus 702. Communication interface 710 may provide a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training samples to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A processor for accelerating tensor transposition operations in machine learning, comprising:

an input tensor shift buffer;

a staging buffer; and an output tensor shift buffer;

wherein:

the input tensor shift buffer is configured to:

perform multiple cycles of input tensor shifting on an input tensor read from an input memory, wherein the multiple cycles of input tensor shifting comprise:

during each of the multiple cycles of input tensor shifting, reading a sub-tensor of the input tensor from the input memory, and writing a result of the cycle of input tensor shifting of the sub-tensor of the input tensor into the staging buffer; and the output tensor shift buffer is configured to:

perform multiple cycles of output tensor shifting on the results read from the staging buffer, wherein the multiple cycles of output tensor shifting comprise:

during each of the multiple cycles of output tensor shifting, reading a sub-tensor from the staging buffer, and writing a result of the cycle of output tensor shifting of the sub-tensor read from the staging buffer to an output memory, wherein the staging buffer is selected from a pool of preconfigured tensor buffer units of different sizes, and selecting of the staging buffer is based on a size of an inner-most dimension of the input tensor, wherein sizes of the pool of preconfigured tensor buffer units are determined based on a utilized in a single read cycle of the input memory, such that a product of sizes of two innermost dimensions of the selected staging buffer corresponds to the maximum memory bandwidth utilized in the single read cycle.

2. The processor of claim 1, wherein the staging buffer comprises a plurality of memory banks.

3. The processor of claim 2, wherein the input tensor shift buffer is further configured to:

during each cycle of the multiple cycles of input tensor shifting:

write the sub-tensor of the input tensor in a first shifting direction across the plurality of memory banks in the staging buffer.

4. The processor of claim 3, wherein to read the sub-tensor of the input tensor, the input tensor shift buffer is further configured to:

read a row of data of the input tensor from the input memory, and to write the sub-tensor of the input tensor in the first shifting direction across the plurality of memory banks in the staging buffer, the input tensor shift buffer is further configured to:

write the row of data of the input tensor in a column direction across the plurality of memory banks in the staging buffer.

5. The processor of claim 3, wherein the output tensor shift buffer is further configured to:

during each cycle of the multiple cycles of output tensor shifting:

write the sub-tensor read from the staging buffer in a second shifting direction into the output memory, wherein the second shifting direction is different from the first shifting direction.

6. The processor of claim 5, wherein to read the sub-tensor from the staging buffer, the output tensor shift buffer is further configured to:

read a row of data from the staging buffer; and to write the sub-tensor read from the staging buffer in the second shifting direction into the output memory, the output tensor shift buffer is further configured to:

write the row of data from the staging buffer by shifting the row of data in the second shifting direction.

7. The processor of claim 1, wherein a direction of the input tensor shifting is opposite to a direction of the output tensor shifting.

8. The processor of claim 1, wherein the staging buffer comprises a pair of buffers of a same size.

9. The processor of claim 8, wherein the pair of buffers comprise a first buffer and a second buffer that support parallel processing, and when the input tensor shift buffer is writing to the first buffer, the output tensor shift buffer is reading from the second buffer.

10. The processor of claim 8, wherein the pair of buffers comprise a first buffer and a second buffer, and after the input tensor shift buffer writes a first result of the multiple cycles of input tensor shifting on a first input tensor into the first buffer, the output tensor shift buffer starts reading the first result from the first buffer to perform the multiple cycles of output tensor shifting; and while the output tensor shift buffer is reading from the first buffer, the input tensor shift buffer starts writing a second result of the multiple cycles of input tensor shifting on a second input tensor into the second buffer, such that the input tensor shift buffer and the output tensor shift buffer avoid idle time.

11. A method for accelerating tensor transposition operations in machine learning, comprising:

performing, using an input tensor shift buffer, multiple cycles of input tensor shifting on an input tensor read from an input memory by:

during each cycle of the multiple cycles of input tensor shifting, reading a sub-tensor of the input tensor from the input memory, and writing, using the input tensor shift buffer, a result of the each cycle of input tensor shifting of the sub-tensor of the input tensor into a staging buffer; and performing, using an output tensor shift buffer, multiple cycles of output tensor shifting on the results read from the staging buffer by:

during each cycle of the multiple cycles of output tensor shifting, reading a sub-tensor from the staging buffer, and writing, using the output tensor shift buffer, a result of the each cycle of output tensor shifting of the sub-tensor read from the staging buffer to an output memory, wherein the staging buffer is selected from a pool of preconfigured tensor buffer units of different sizes, and selecting of the staging buffer is based on a size of an inner-most dimension of the input tensor, wherein sizes of the pool of preconfigured tensor buffer units are determined based on a utilized in a single read cycle of the input memory, such that a product of sizes of two innermost dimensions of the selected staging buffer corresponds to the maximum memory bandwidth utilized in the single read cycle.

12. The method of claim 11, wherein the staging buffer comprises a plurality of memory banks.

13. The method of claim 12, wherein the performing the multiple cycles of input tensor shifting on the input tensor read from the input memory comprises:

during each cycle of the multiple cycles of input tensor shifting:

shifting the sub-tensor of the input tensor in a first shifting direction across the plurality of memory banks when writing to the staging buffer.

14. The method of claim 13, wherein the sub-tensor read from the input memory comprises a row of data of the input tensor, and the writing the result of the each cycle of input tensor shifting into the staging buffer comprises:

writing the row of data of the input tensor in a column direction across the plurality of memory banks in the staging buffer.

15. The method of claim 13, wherein the performing the multiple cycles of output tensor shifting on the results read from the staging buffer comprises:

during each cycle of the multiple cycles of output tensor shifting:

shifting the sub-tensor read from the staging buffer in a second shifting direction when writing to the output memory, wherein the second shifting direction is different from the first shifting direction.

16. The method of claim 15, wherein the sub-tensor read from the staging buffer comprises a row of data read from the staging buffer, and the writing the result of the each cycle of output tensor shifting to an output memory comprises:

write the row of data from the staging buffer by shifting the row of data in the second shifting direction.

17. The method of claim 11, wherein a direction of the input tensor shifting is opposite to a direction of the output tensor shifting.

18. The method of claim 11, wherein the staging buffer comprises a pair of buffers of a same size.

19. The method of claim 18, wherein the pair of buffers comprise a first buffer and a second buffer that support parallel processing, and when the input tensor shift buffer is writing to the first buffer, the output tensor shift buffer is reading from the second buffer.

20. The method of claim 18, wherein the pair of buffers comprise a first buffer and a second buffer, and after the input tensor shift buffer writes a first result of the multiple cycles of input tensor shifting on a first input tensor into the first buffer, the output tensor shift buffer starts reading the first result from the first buffer to perform the multiple cycles of output tensor shifting; and while the output tensor shift buffer is reading from the first buffer, the input tensor shift buffer starts writing a second result of the multiple cycles of input tensor shifting on a second input tensor into the second buffer, such that the input tensor shift buffer and the output tensor shift buffer avoid idle time.

* * * * *